US012610304B2

(12) United States Patent
Pandey et al.

(10) Patent No.: US 12,610,304 B2
(45) Date of Patent: Apr. 21, 2026

(54) DYNAMIC INTEGRATED ACCESS AND BACKHAUL FOR WIRELESS NETWORKS

(71) Applicants:AT&T Communications Services India Private Limited, Karnataka (IN); AT&T Intellectual Property I, L.P., Atlanta, GA (US)

(72) Inventors: Mritunjay Pandey, Bangalore (IN); Saurav Paira, Dayton, NJ (US); Subhash Kapoor, Wall, NJ (US)

(73) Assignees: AT&T Intellectual Property I, L.P., Atlanta, GA (US); AT&T Communications Services India Private Limited, Karnataka (IN)

( * ) Notice: Subject to any disclaimer, the term of this patent is extended or adjusted under 35 U.S.C. 154(b) by 642 days.

(21) Appl. No.: 18/061,631

(22) Filed: Dec. 5, 2022

(65) Prior Publication Data

US 2024/0187964 A1     Jun. 6, 2024

(51) Int. Cl.
*H04W 40/24* (2009.01)
*H04W 48/20* (2009.01)
*H04W 88/08* (2009.01)

(52) U.S. Cl.
CPC ......... *H04W 40/246* (2013.01); *H04W 48/20* (2013.01); *H04W 88/08* (2013.01)

(58) Field of Classification Search
None
See application file for complete search history.

(56) References Cited

U.S. PATENT DOCUMENTS

| | | |
|---|---|---|
| 2020/0022054 A1 | 1/2020 | Hong et al. |
| 2020/0154287 A1 | 5/2020 | Novlan et al. |
| 2021/0168628 A1 | 6/2021 | Novlan et al. |
| 2021/0235291 A1 | 7/2021 | Byun et al. |
| 2021/0410058 A1* | 12/2021 | Dey ..................... H04W 40/24 |

(Continued)

OTHER PUBLICATIONS

"3GPP TS 38.401 version 16.2.0 Release 16", ETSI TS 138 401 V16.2.0, Jul. 2020, 79 Pages.

(Continued)

*Primary Examiner* — Anh Ngoc M Nguyen
(74) *Attorney, Agent, or Firm* — Guntin & Gust, PLC; Colin LaRose

(57) ABSTRACT

Aspects of the subject disclosure may include, for example, discovering a network topology of a radio access network (RAN) domain of a cellular communication system, including a base station and a wireless backhaul. The base station includes a centralized unit and distributed units configured for wireless communication with user equipment and, via the wireless backhaul, with the centralized unit. Operation of the RAN domain is observed, wherein the wireless backhaul includes at least one distributed unit in wireless communication with the centralized unit, and in further communication with a core network via the centralized unit. A demand for a cellular communication service is determined and the wireless backhaul is configured according to the demand and the observations. The configured wireless backhaul network includes the at least one distributed unit of the number of distributed units in wireless communication with the centralized unit. Other embodiments are disclosed.

20 Claims, 13 Drawing Sheets

(56) References Cited

U.S. PATENT DOCUMENTS

| 2022/0255830 A1 | 8/2022 | Lee |
| 2024/0114496 A1* | 4/2024 | Huang ............... H04B 7/15542 |

OTHER PUBLICATIONS

"What is 5G Integrated Access and Backhaul (IAB)?", https://www.metaswitch.com/knowledge-center/reference/what-is-5g-in, Aug. 3, 2022, 3 Pages.

Ronkainen, H. et al., "Integrated Access and Backhaul", Ericsson Technology Review, Jun. 23, 2020, 12 Pages.

Sangam, P., "IAB—the cost-effective solution to quickly expand 5G mmWave coverage (Analyst Angle)", https://www.rcrwireless.com/20200727/5g/iab-the-cost-effective-solution-to-quickly-expand-5g-mmwave-coverage-analyst-angle, Jul. 27, 2020, 6 Pages.

Zhang, B. et al., "Resource Allocation in mmWave 5G IAB Networks: A Reinforcement Learning Approach based on Column Generation", Preprint submitted to Elsevier, Politecnico di Milano, Dipartimento di Elettronica, Informazione e Bioingegneria, 20133 Milan, Italy.

NEC Laboratories Europe, Heidelberg, Germany.

Milan Research Center, Huawei Technologies Italia S.r.l., 20147 Milan, Italy, Sep. 2021, 19 Pages.

* cited by examiner

100

201

207

5G Core
208

Access
Domain
Controller
209

211
202b
P2

205c

203c

206

D21

210b
P3

205a

210a
P1
202a

203a

205b

203b

200

220

230

260

265

291

Obtain data from radio point(s)

292

Train ML/DL engine

293

Apply radio point(s) data to ML/DL engine

294

Suitably trained?

N

Y

295

Revise IAB?

N

Y

296

Apply trained model

297

Revise IAB according to trained model

<u>290</u>

300

600

DYNAMIC INTEGRATED ACCESS AND BACKHAUL FOR WIRELESS NETWORKS

FIELD OF THE DISCLOSURE

The subject disclosure relates to a dynamic integrated access and backhaul for wireless networks.

BACKGROUND

Wireless telecommunication networks provide network connectivity to user equipment ("UE"), such as mobile telephones or other wireless communication devices, via a radio access network ("RAN"). A RAN may include multiple base stations, which may be distributed geographically, through which UEs may connect. The RAN may communicate via one or more backhaul links, such as fiber links or other wired links, with a mobile core network, such as an Evolved Packet Core ("EPC"), a Fifth Generation ("5G") core ("5GC"), and/or other type of core network.

Some wireless networks may include RANs that utilize one or more wireless links in a mobile network architecture, in which base stations of a RAN may be used as "nodes" to wirelessly relay traffic between the mobile core network the UEs. A new wireless backhaul solution for 5G New Radio, referred to as integrated access and backhaul (IAB), permits densification of wireless mobile networks with multi-band radio sites at street level. Transport networks may be used to interconnect components of a RAN. For example, the transport network may use dark fiber for transport of control and/or user plane traffic. An backhaul strategy utilizing an IAB system includes wireless backhaul links to interconnect RAN sites in which fiber is either not available or too costly The IAB system may include a macro cell serving as IAB donor that terminates a wireless backhaul link to one or more small cells, which may be referred to as IAB Nodes. An IAB node may be considered as a relay cell that is wirelessly connected to the donor. If a UE is connected to an IAB node, the communication may be relayed to a macro cell via the IAB system. The macro cell may be in communication with a mobile core network via a traditional transport medium, such as an optical fiber, completing a backhaul from the IAB node to the mobile core network.

By way of example, city centers may include a handful of donor sites with fiber backhaul, connecting to one or more clusters of IAB nodes around them. The IAB nodes may not add new capacity, e.g., a backhaul capacity. Rather, they may share a capacity of the donor site much more efficiently across a much larger coverage area.

BRIEF DESCRIPTION OF THE DRAWINGS

Reference will now be made to the accompanying drawings, which are not necessarily drawn to scale, and wherein.

DETAILED DESCRIPTION

Figure 1:
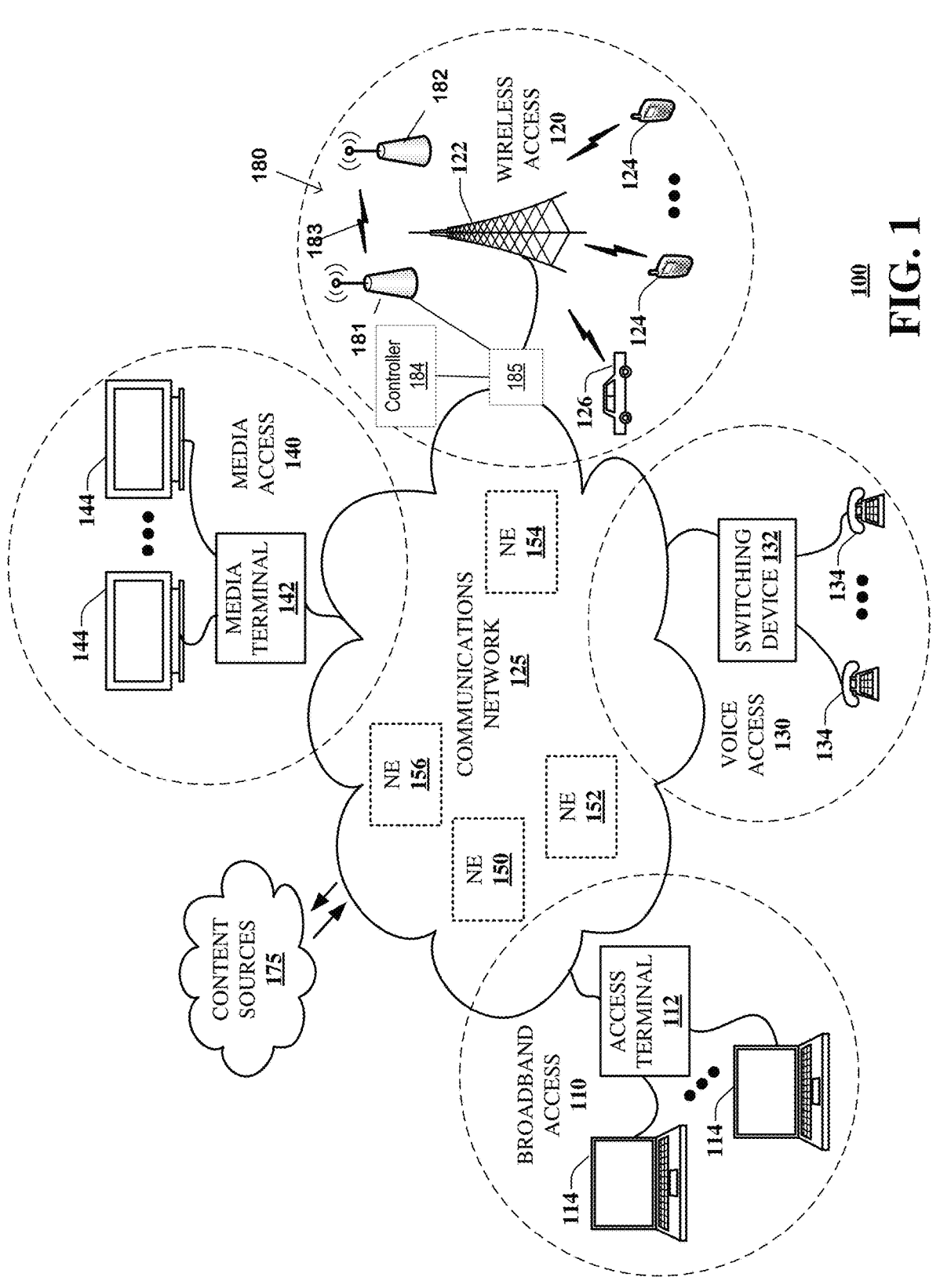
FIG. 1 is a block diagram illustrating an exemplary, non-limiting embodiment of a communications network in accordance with various aspects described herein.

The subject disclosure describes, among other things, illustrative embodiments for discovering a network topology of a mobile cellular RAN configured for wireless backhaul operation in a millimeter wave spectrum, for identifying operational parameters of RAN nodes, and for applying a machine learning approach to train a model based on observations of RAN performance in view of the discovered topology and operational parameters. A RAN configuration may be determined according to the trained model to address a backhaul requirement. Other embodiments are described in the subject disclosure.

One or more aspects of the subject disclosure include a process that includes discovering, by a processing system including a processor, a network topology of a radio access network (RAN) domain of a 5G wireless communication system. The RAN domain includes a number of gNodeB distributed units (gNB-DUs) and a gNodeB centralized unit (gNB-CU). The number of gNB-DUs are configured for wireless communication with the gNB-CU. The process further includes obtaining, by the processing system, a number of observations of operation of the RAN domain configured to deliver 5G wireless communication services to a number of wireless communication devices via a least one gNB-DU of the number of gNB-DUs. The 5G wireless communication services utilize an integrated access backhaul (IAB) network of the RAN domain, which includes at least one gNB-DU of the number of gNB-DUs in wireless communication with the gNB-CU. The gNB-DU is in further communication with a 5G core network via the gNB-CU. The process further includes determining, by the processing system, a demand for the 5G wireless communication services, and configuring, by the processing system, the IAB network to obtain a configured IAB network according to the demand and according to the number of observations. The configured IAB network includes the at least one gNB-DU of the number of gNB-DUs in wireless communication with the gNB-CU.

One or more aspects of the subject disclosure include a device, having a processing system including a processor and a memory that stores executable instructions. The executable instructions, when executed by the processing system, facilitate performance of operations that include discovering a network topology of a radio access network (RAN) domain of a cellular communication system. The RAN domain includes a base transceiver station and a wireless backhaul network. The base transceiver station includes a centralized unit and a number of distributed units configured for wireless communication with user equipment and, via the wireless backhaul network, with the centralized unit. The operations further include observing operation of the RAN domain, to obtain a plurality of observations, wherein the wireless backhaul network includes at least one distributed unit of the plurality of distributed units in wireless communication with the centralized unit, the at least one distributed unit in further communication with a mobile cellular core network via the centralized unit. The operations further include determining a demand for a cellular communication service and configuring the wireless backhaul network to obtain a configured wireless backhaul network according to the demand and according to the plurality of observations. The configured wireless backhaul network includes the at least one distributed unit of the number of distributed units in wireless communication with the centralized unit.

One or more aspects of the subject disclosure include a machine-readable medium, including executable instructions that, when executed by a processing system including a processor, facilitate performance of operations. The operations include identifying network elements of a radio access domain of a mobile communication system. The radio access domain includes a base transceiver station having a centralized unit and a number of distributed units configured for wireless communication with user equipment and with the centralized unit. The operations further include observing operation of the radio access domain configured to deliver mobile communication services to the user equipment via a least one distributed unit of the number of distributed units. The mobile communication services utilize a wireless backhaul network of the radio access domain comprising at least one distributed unit of the plurality of distributed units in wireless communication with the centralized unit, the at least one distributed unit in communication with a mobile cellular core network via the centralized unit. The operations further include determining a demand for the mobile communication services, and configuring the wireless backhaul network to obtain a configured wireless backhaul network according to the demand and according to the observing. The configured wireless backhaul network comprises the at least one distributed unit of the plurality of distributed units in wireless communication with the centralized unit.

Referring now to FIG. 1, a block diagram is shown illustrating an example, non-limiting embodiment of a system 100 in accordance with various aspects described herein. For example, system 100 can facilitate in whole or in part discovering a network topology of an RAN having an integrated access backhaul (IAB) system 180 configured for operation in a millimeter wave spectrum, for identifying operational parameters of RAN nodes 181, 182, and for applying a machine learning approach to train a model based on observations of RAN performance in view of the discovered topology and operational parameters. A configuration of the IAB system 180, including operating channels and/or bandwidth may be determined according to the trained model to address a RAN backhaul requirement.

A communications network 125 is presented for providing broadband access 110 to a plurality of data terminals 114 via access terminal 112, wireless access 120 to a plurality of communication devices, referred to generally as user equipment (UE). Without limitation, UE may include one or more of mobile telephones, tablet devices, c-readers, laptop computers, smart watches, desktop computers, Internet of Things ("IoT") devices, Machine-to-Machine ("M2M") devices, and/or other types of devices that may be mobile and/or stationary. According to the illustrative example, the UE include mobile devices 124 and vehicle(s) 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The IAB system 180 includes a centralized unit 181, e.g., a gNB-CU and at least one distributed unit 182, e.g., a gNB-DU. The distributed unit 182 may be adapted for terminating an air interface that supports wireless service to the mobile devices 124 and/or vehicle(s) 126. The distributed unit 182 may be in communication with a mobile core network 185 via a back haul network. According to the illustrative example, the IAB system 180 allows the distributed unit 182 to communicate with the centralized unit 181 via a wireless backhaul link 183. The wireless backhaul link 183 may be adapted to transfer control signaling and/or user data for one or more of the UEs attached to the distributed unit 182. In at least some embodiments, at least one wireless channel is allocated to a wireless link of the IAB system 180. The wireless channel may reside within a common frequency band, e.g., a millimeter wave band, as communications between the UE and the distributed unit 182.

One or more of the centralized unit 181 and the distributed unit 182 may be in communication with an IAB system controller 184. The IAB system controller 184 may be configured to implement in whole or in part, a discovering of a network topology of the IAB system 180, for identifying operational parameters of distributed unit 182 and/or the centralized unit 181, and for applying a machine learning approach to train a model based on observations of performance of the IAB system 180 in view of the discovered topology and operational parameters. A configuration of the IAB system 180, including operating channels and/or bandwidth may be determined according to the trained model to address a backhaul requirement.

Figure 2A:
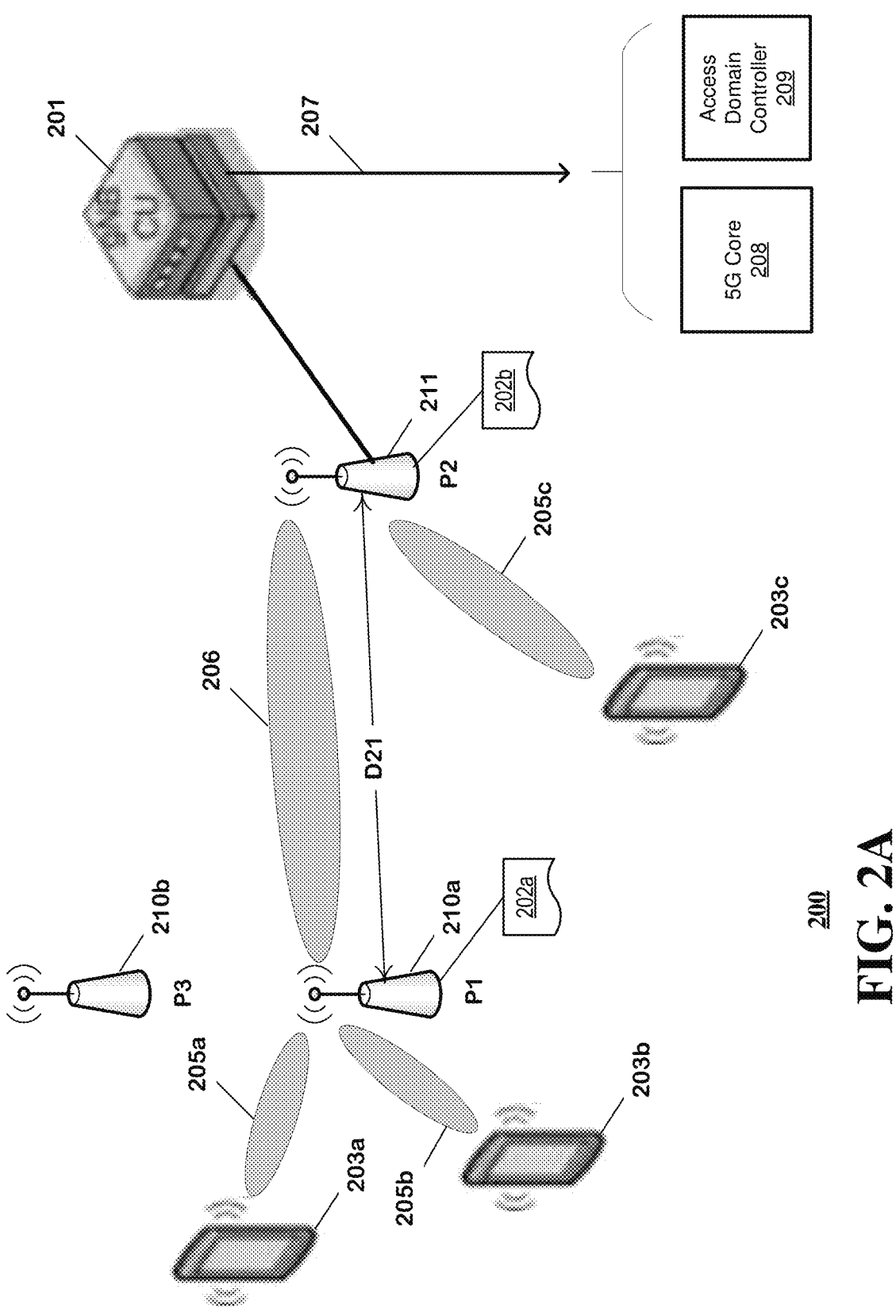
FIG. 2A is a block diagram illustrating an example, non-limiting embodiment of an IAB system functioning within the communication network of FIG. 1 in accordance with various aspects described herein.

FIG. 2A is a block diagram illustrating an example, non-limiting embodiment of an IAB system 200 functioning within the communication network 100 of FIG. 1 in accordance with various aspects described herein. The IAB system 200 includes one or more base transceiver stations configured to provide wireless mobile service to one or more groups of devices, referred to generally as user equipment (UE). The illustrative example includes three UE devices, represented by mobile phones 203a, 203b, 203c, generally 203. The wireless mobile service may include, without limitation, a voice service, a messaging service, a data service, a streaming media service, a location service and the like. The wireless mobility service may also be configured to manage mobility of the UE, e.g., including attachment of a UE to a serving base transceiver station providing wireless coverage with a corresponding cell area. The service may be adapted to manage mobility of the UE, e.g., providing a handover capability from a target serving cell to another cell. Wireless mobile service may include any of the examples provided herein, including 4G, LTE, New Radio (NR), 5G, as well as future extensions, e.g., 6G and beyond.

The IAB system 200 may include a 5G NR, gNodeB 201, configured with a function split capability by which a 5G gNB 201 includes a centralized unit 211 in communication between a mobility core network 208 and a group of distributed units 210 in communication with the mobility core network 208 via the centralized unit 211. Transport of messages between the distributed units 210 and the centralized unit 211 may occur over transport links that may include cabled links and/or wireless backhaul links 206. According to 3GPP Technical Specification 3GPP TS 38.401, describing an overall architecture of IAB, the centralized unit may represent a 5G gNB-CU 211, the distributed unit may represent a 5G gNB-DU 210. It is understood that a wireless backhaul link 206 between the gNB-CU 211 and the gNB-DU 210 may operate over one or more channels residing in frequency spectrum allocated for mobile service to UEs. In at least some embodiments, the channel, frequency, bandwidth and/or sharing strategies, e.g., FDD, TDD, may be prescribed by a standards body.

The gNB-CU 211 may be in communication with the 5G core network 208 via a transport network 207. Generally, the transport network 207 can include any suitable network configured to reliably transport backhaul data between the gNB-CU 211 and the 5G core network 208. Example transport networks 207 include, without restriction, cable, e.g., copper twisted pair, coaxial cable and/or fiberoptic cable. Alternatively, or in addition, the transport network 207 may include a wireless network, such as a microwave line of sight (LOS) network, a free-space optical LOS network, a satellite communications network, and so on. Messages exchanged by the transport network 207 may include, without limitation, control plane traffic, user data plane traffic, and/or overhead traffic, e.g., according to an operation and maintenance sideband channel, voice and/or data, and the like.

According to the illustrative example, the 5G-DU 210 is located at a first position P1, which may be represented by one or more of coordinates of a reference grid, a set of geolocation coordinates, an address, and the like. Likewise, the 5G-CU 211 is located at a second position P2, which may also be represented by one or more of a set of geolocation coordinates, an address, and the like. A distance between the locations P1. P2 may be represented by a line D21. The line may represent a physical separation distance and/or a radio line of site distance.

One or more of the gNB-DU 210 and the gNB-CU 211 may be configured to terminate an air interface to one or more UEs. For example, the gNB-DU 210 terminates a first air interface 205*a* to a first UE 203*a* and a second air interface 205*b* to a second UE 203*b*. Likewise, the gNB-CU 211 terminates a third air interface 205*c* to a third UE 203*c*. The air interfaces 205*a*, 205*b*, 205*c*, generally 205, may be defined according to one or more mobile network standards, such as any of the various examples disclosed herein. The air interfaces may include a physical layer that utilizes an assigned frequency, bandwidth and/or frequency range, e.g., a radio frequency (RF) channel, of the electromagnet spectrum. The RF channel may be included within a licensed portion of the spectrum, an unlicensed portion of the spectrum, or both licensed and unlicensed portions of the spectrum.

It is understood that one or more of the gNB-DU 210 and the gNB-CU 211 may include a radio terminal, referred to generally as a radio point. The radio point may include one or more antennas that may be fixed or configurable and adapted to transmit and/or receive wireless signals within the appropriate RF channels. The radio point may include a radio transmitter that includes one or more subsystems, such as a modulator, a power amplifier, possibly one or more filters, a channel encoder, a digital-to-analog converter (DAC), and so on, as may be utilized in wireless terminals confirming with one or more wireless communication standards. Alternatively, or in addition, the radio point may include a radio receiver that may also include one or more subsystems, such as a demodulator, a low noise amplifier, possibly one or more filters, a channel decoder, an analog-to-digital converter (ADC), and so on, as may be utilized in wireless terminals confirming with one or more wireless communication standards.

It is understood further that one or more of the antennas, and/or subsystems of the transmitter and/or receiver may be configurable. Settings may include, without limitation, frequency tuning, bandwidth selection, gain adjustments, filter selection, antenna directivity and/or steering, and the like. The example gNB-DU 210 may be associated with a first parameter listing 202*a* that may identify a configuration and/or any configurable and/or configured parameters of the gNB-DU 210. For example, the parameter listing 202*a* may identify one or more configured parameters and/or one or more configurable ranges of such parameters. Likewise, the example gNB-CU 211 may be associated with a second parameter listing 202*b* that may identify a configuration and/or any configurable and/or configured parameters of the gNB-CU 211. For example, the parameter listing 202*b* may identify one or more configured parameters and/or one or more configurable ranges of such parameters. The parameter listings 202*a*, 202*b* may be stored at the respective gNB-DU 210, the gNB-CU 211, and/or at some other location, such as a provisioning database.

The example IAB system 200 includes an access domain controller 209. The access domain controller may include an intelligent IAB system controller adapted to associate one or more gNB-DU 210*a*, 210*b*, generally 210, with a gNB-CU 211. Such associations may be based on backhaul criteria, such as reachability of a particular gNB-DU 210 to the gNB-CU 211. Reachability may be based on one or more parameters 202 considered alone and/or in combination with other conditions, such as conditions of an over-the-air air channel between the gNB-DU 210 and the gNB-CU. It is understood that one or more characteristics of the over-the-air channel may vary with channel conditions as may be impacted by one or more of atmospheric conditions, traffic conditions, nonlinear effects, multipath, interference, and the like.

In at least some embodiment, the access domain controller 209 may identify and/or otherwise select one or more configurations of the gNB-DU 210 and/or the gNB-CU, e.g., by selecting from among selectable parameters 202 to identify a suitable configure of the IAB system. It is further understood that such parameter selections and/or suitability may depend on one or more other factors, such as required capacity, demand, supported types of application(s), QoS, and the like. Still other considerations may include available channels, identification of channels as may be reserved and/or otherwise associated with other users. In at least some embodiments, the access domain controller 209 may include intelligence, e.g., according to one or more of a data analysis module a machine learning module, e.g., an artificial intelligence engine, and the like.

Figure 2B:
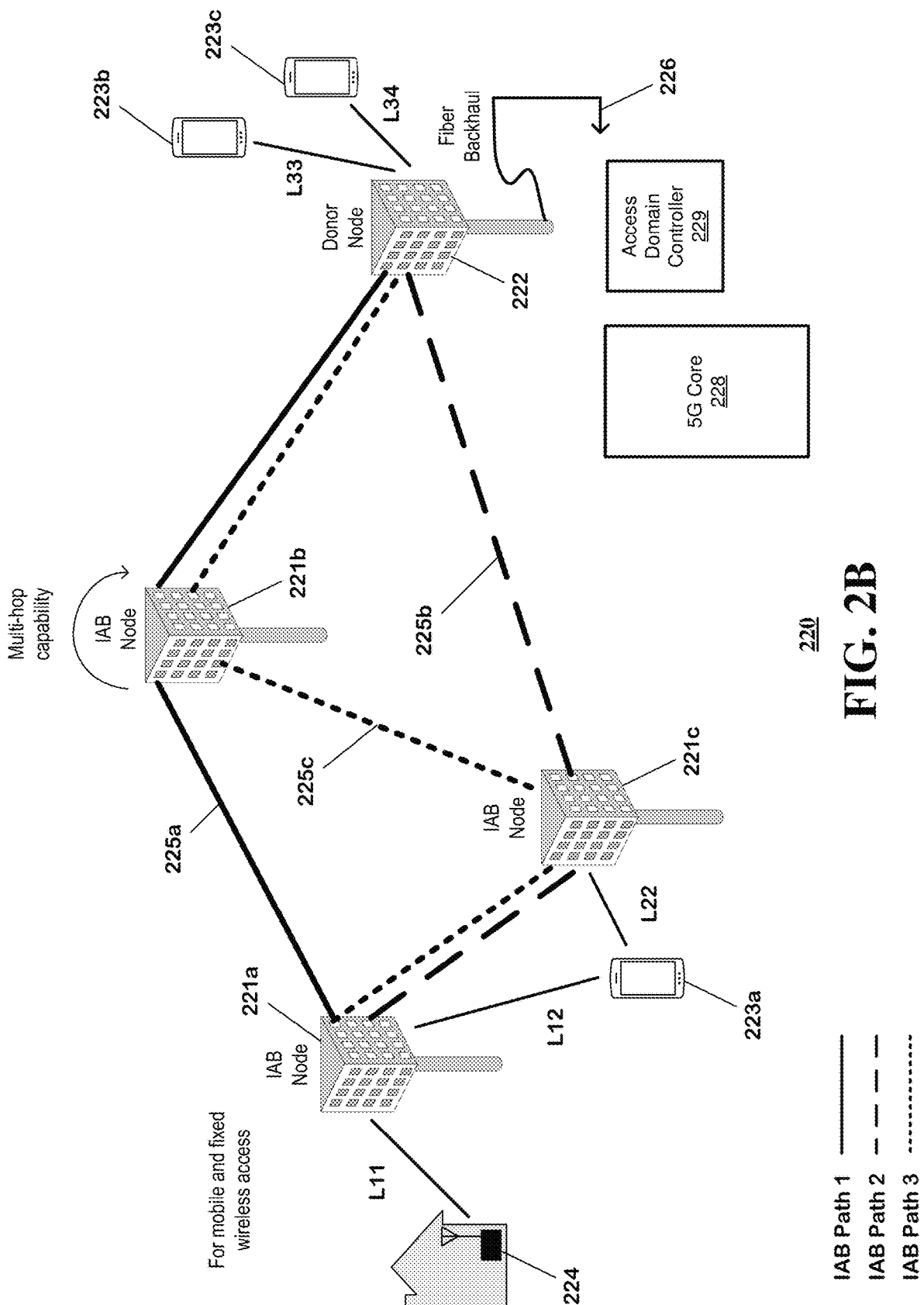
FIG. 2B is a block diagram illustrating another example, non-limiting embodiment of an IAB system functioning within the communication network of FIG. 1 in accordance with various aspects described herein.

FIG. 2B is a block diagram illustrating another example, non-limiting embodiment of an IAB system 220 functioning within the communication network 100 of FIG. 1 in accordance with various aspects described herein. The example IAB system 220 includes three IAB nodes 221*a*, 221*b*, 221*c* generally 221, and one IAB donor node 222. In at least some embodiments, the donor node 222 may include a macro cell in communication with a 5G core network 228 via a fiber backhaul 226. In a 5G application the IAB nodes 221 may include a gNB-DU and/or a gNB-CU. Each node 221 includes a radio point having a radio and an antenna, as well as a gNB unit adapted to implement one or more protocol layers according to operation of mobile communication services. According to the example RAN configuration, a first IAB node 221*a* may be considered as a source node for an air interface L11 to a UE 224. According to the illustrative example, the first IAB node 221*a* is not configured to access a 5G core network 228 directly via a backhaul fiber. Instead, a backhaul is provided via a wireless link between the source node 221*a* and the donor node 222.

In this example, a single segment wireless connection may not be achievable between the source node 221*a* and the donor node 222. In this regard, it may be said that the source node 221*a* is not reachable. For example, a distance between the source node 221*a* and the donor mode 222 may be too great and/or there may be some obstruction blocking and/or otherwise interfering with a direct line of sight between the source node 221*a* and the donor node 222. One or more other IAB nodes 221*b*, 221*c* may engage in a relay arrangement between the source node 221*a* and the donor node 222, enabling the source and donor nodes to be linked via a multi-hop wireless link. According to the illustrative example, three distinct IAB relay paths may be considered. A first IAB relay path 225*a* is considered between the source node 221*a* and the donor node 222 via the second IAB node 221*b*, representing a two-hop link. Similarly, a second IAB path 225*b* is considered between the source node 221*a* and the donor node 222 via the third IAB node 221*c*, representing another, distinct two-hop link. Likewise, a third IAB path 225*c* is considered between the source node 221*a* and the donor node 222 via the second and third IAB nodes 224*b*, 221*c*, representing an example of a three-hop link.

The source node 221*a* is in communication with the 5G core network 228 via one of the multi-hop, IAB paths 225*a*, 225*b*, 225*c*, generally 225. In the illustrative example, the donor node 222 is in communication with the 5G core network 228 via a traditional fiber backhaul 226. Accordingly, the IAB backhaul to the source node 221*a* includes a respective one of the IAB paths 225 and the backhaul fiber 226. It is understood that one or more of the IAB nodes may support air interfaces with UEs, each having a respective IAB backhaul link through the donor node 222 and to the 5G core network. For example, the source node 221*a* and/or the third node 221*c* may be in communication with a first UE 223*a* via air interfaces L12 and L22, while the donor node 222 may be in communication with one or more other UEs 223*b*, 223*c*, e.g., over respective air interfaces L33, L34.

The example IAB system 220 may include an access domain controller 229. The access domain controller 229 may be collocated with the 5G core network 228. Alternatively, or in addition, the access domain controller 229 may be located elsewhere, e.g., reachable by network connection as may be managed via a convenient location, such as the 5G core network 228. The access domain controller 229 may be configured to identify IAB nodes, including one or more source nodes 221*a*, relay nodes 221*b*, 221*c* and/or donor nodes 222. The identified IAB nodes may serve different functions, depending upon which nodes are being considered as a source, as a relay and/or as a donor. The access domain controller 229 may be configured to evaluate more than one possible IAB path for an identified IAB source-donor pair. In at least some embodiments, the access domain controller 229 may be configured to evaluate all possible paths according to different combinations of IAB nodes. Having accomplished such an exhaustive evaluation, the access domain controller 229 may be configured to select one path from among the possible combinations. Selections may be made according to performance, e.g., maximizing and/or otherwise optimizing one or more parameters. Some examples of parameters may include, without limitation, conservation of channel bandwidth, avoidance of reserved and/or otherwise allocated channel bandwidth, minimizing transit power level requirements, optimizing modulation techniques, minimizing relay nodes, and so on.

A main donor site, such as the example donor node 222, may require a high-capacity fiber backhaul 226. One or more IAB nodes 221 may connect to a single donor site 222. In at least some embodiments, each IAB node 221, 222 may connect to multiple sites and/or IAB nodes, e.g., providing redundancy. In at least some embodiments, the example IAB configurations may employ a mesh architecture. The various IAB configurations and techniques disclosed herein may be transparent to UE, such that the UE connect to IAB nodes 221, 222 just as they would to any regular base stations.

Figure 2C:
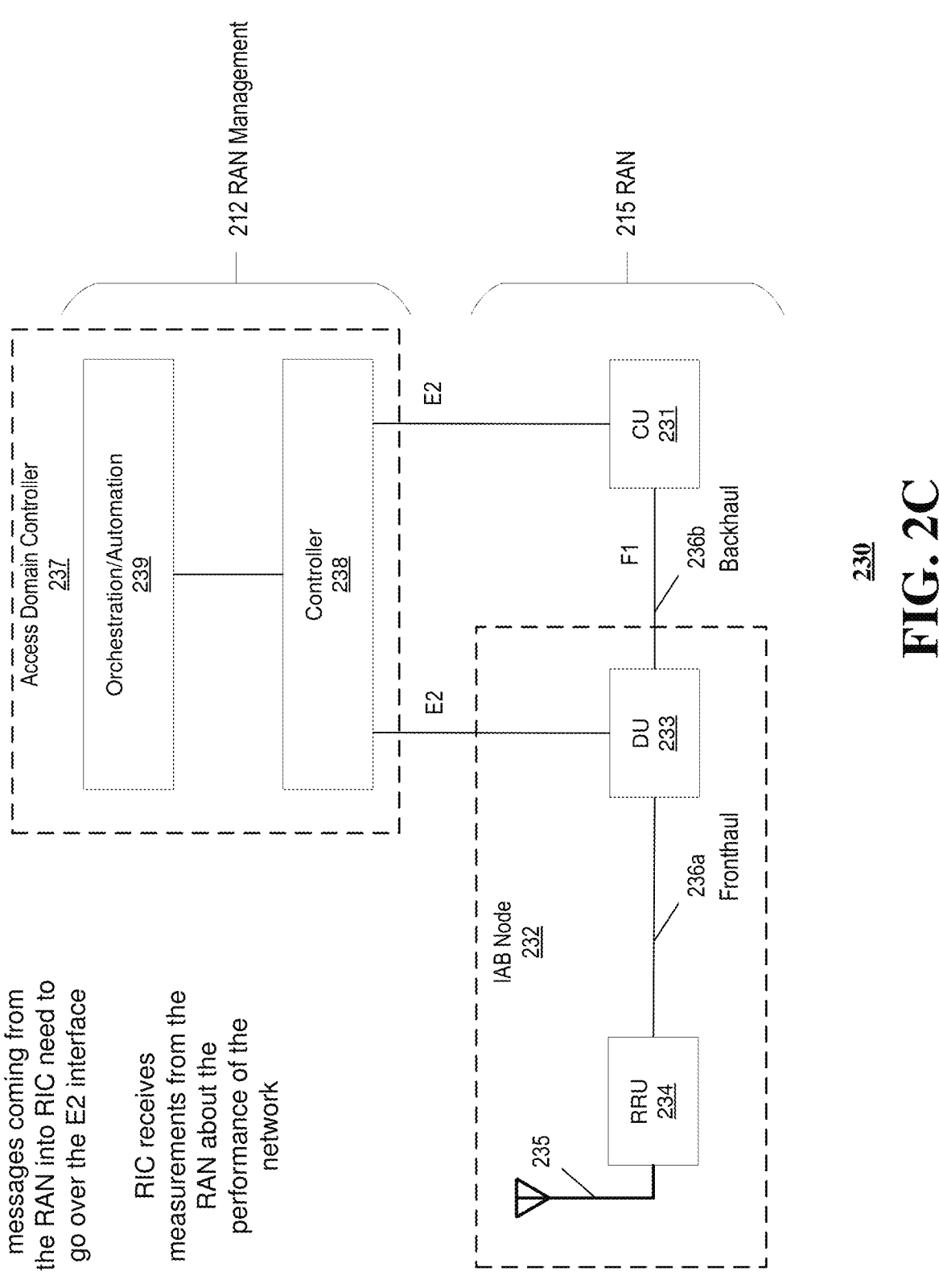
FIG. 2C is a block diagram illustrating an example, non-limiting embodiment of a portion of an IAB system functioning within the communication network of FIG. 1 in accordance with various aspects described herein.

FIG. 2C is a block diagram illustrating an example, non-limiting embodiment of a portion of an IAB system 230 functioning within the communication network 100 of FIG. 1 in accordance with various aspects described herein. The example IAB system 230 includes a RAN subsystem 215 and a RAN management subsystem 212. The RAN subsystem 215 includes a centralized unit 231 and a distributed unit 233. According to a 5G application, a RAN may include at least one gNB. The gNB is a logical node, which may be split into one centralized unit (CU) and one or more distributed units (DU). The CU may host higher layer protocols to a UE and terminates a control plane and user plane interfaces to a 5G core network. The CU may control one or more DU nodes over one or more F1 interface(s), whereby the DU node(s) may host lower layer protocols, e.g., for a new radio (NR) Uu interface to the UE.

According to the illustrative example, the centralized unit 231 may include a gNB-CU and a distributed unit may include a gNB-DU. The example distributed unit 233 is illustrated as part of an IAB node 232 that includes the distributed unit 233 in communication with a remote radio unit (RRU) 234, in further communication with an antenna 235. It is envisioned that in at least some embodiments, the RRU 234 may be collocated with the distributed unit 233, while in others it may be separated by some distance. Accordingly, the IAB node 232 may include a fronthaul link 236*a* configured to convey signals between the RRU 234 and the distributed unit 233. The distributed unit 233, in turn, may be in communication with the centralized unit 231 via a backhaul link 236*b*. The RRU 234 may terminate an air interface with one or more UEs operating within a first operational frequency band, e.g., within licensed spectrum adapted to support a 5G mobile service.

In at least some embodiments, e.g., 5G, an "F1" interface is established between the centralized unit 231 and the distributed unit 233 via the backhaul link 236*b*. According to a 5G example, the F1 interface connects a gNB CU to a gNB DU, according to a CU-DU splitting architecture. The F1 interface may include a control plane portion (F1-C) that allows for an exchange of signaling information between the CU and DU. The F1 interface may also include a user plane portion (F1-U) that allows for a transfer of application data. According to an IAB application, the F1 interface may be supported over a wireless link that may operate in the same and/or nearby portion(s) of frequency spectrum as the air interface with the UEs.

The RAN management subsystem 212, is in communication with one or more of the centralized unit 231 and the IAB node 232, e.g., including the distributed unit 233 and/or the RRU 234. In at least some embodiments, e.g., 5G, the RAN management subsystem utilizes an E2 interface for controlling one or more of the centralized unit 231 and/or the IAB node 232, including the distributed unit 233 and/or the RRU 234. In at least some embodiments, control may include configuration of one or more of the centralized unit 231 and/or the IAB node 232, including the distributed unit 233 and/or the RRU 234. Configuration may include configurations for the air interface between the RRU 234 and any UEs. Alternatively, or in addition, configuration may include configuration of the access network, e.g., a configuration of an IAB portion of a 5G system.

Configuration may include, without limitation, establishment of a wireless backhaul link between the distributed unit 233 and the centralized unit 231. IAB configurations may include, without limitation, an association of the distributed unit 233 with the centralized unit 231, e.g., as in a segment and/or "hop" of a wireless backhaul link, selection of a frequency spectrum or channel to support the wireless backhaul link, selection of a bandwidth and/or one or more configurable parameters. In some embodiments, there may be one or more intervening distributed units (not shown) arranged in a relay fashion, e.g., supporting F1 interfaces over wireless links between nodes. Other configurable parameters may include, without limitation, transmit power levels, modulation techniques, channel encoding, error encoding, antenna configuration as may contribute to a gain profile, and so on. The centralized unit 231 and/or the distributed unit 233 may respond to such control messages by configuring their respective resources as instructed.

The example RAN management subsystem 212 includes an access domain controller 237. The access domain controller 237 may be configured to evaluate access domain requirement, including current requirements, scheduled requirements and/or forecasted requirements. The access domain controller 237 may be configured further to identify a configuration of RAN resources based on the requirements, e.g., to satisfy required service, possibly including some amount of spare capacity and/or overhead. According to the illustrative 5G IAB configurations, the access domain controller 237 may be configured to identify one or more wireless IAB paths between one or more distributed units 233 and a centralized unit 231. To the extent an access network may have more than one centralized unit 231, it is understood that the access domain controller 237 may be configured to identify one or more respective paths for each of the centralized units 231. The paths may originate at a source distributed unit 233, e.g., in communication with a RRU 234 supporting an air interface with a UE and terminate at the centralized unit 231. In at least some embodiments, a path may include one or more relay nodes, e.g., one or more distributed units in communication between the source distributed unit 233 and the centralized unit 231 and supporting an F1 interface therebetween.

It is envisioned that in at least some embodiments, a network implementation incorporating the access network configuration and control techniques disclosed herein may include software defined network elements. Such software defined network elements may facilitate a configuration and/or reconfiguration of network resources to respond to demand for wireless services, providing flexibility to accommodate changes in demand as may occur according to a planned and/or unplanned event. According to the illustrative example, the access domain controller 237 includes a controller 238 in communication with an orchestration and/or automation module 239. The orchestration and/or automation module 239 may be configured to identify a size and nature of a demand for wireless services, to develop a network configuration strategy and/or plan responsive to the demand and to initiate a reconfiguration of the access network according to the strategy.

The orchestration and/or automation module 239 may provide a configuration and/or reconfiguration strategy or plan to the controller 238, which, in turn, provides control messages to one or more of the RAN nodes, e.g., the centralized unit 231 and/or the distributed unit 233. For 5G applications, the control messages may be provided via an E2 interface. Although an E2 interface is illustrated between the distributed unite 233 and the controller 238, it is understood that in at least some embodiments, the E2 interface does not indicate a direct communication link, but rather may be established via the backhaul network 236b.

In at least some embodiments, the orchestration and/or automation module 239 may implement machine learning. In at least some embodiments, the machine learning may be configured to predict one or more controllable features of the access network based on a requirement. For example, the machine learning may be adapted to recommend a network configuration strategy and/or plan responsive to a demand requirement. The plan may be provided to the controller 238, which provides control messages to RAN resources to initiate an implementation of the plan. In at least some embodiments, the controller may receive feedback by way an indication as to whether an implementation of the plan was successful or not, e.g., whether a configured link was reachable in that a source distributed node 233 was able to provide requested service(s) according to a required performance metric, e.g., data rate, bandwidth, signal level, QoS. Such feedback may be provided via the configured IAB, e.g., at least partially over the backhaul portion 236b. The controller 238 may provide feedback to the orchestration and/or automation module 239, which, in turn, may be configured to evaluate the feedback to determine whether the recommended configuration and/or plan was successful. In at least some embodiments, the feedback may be utilized by the orchestration and/or automation module 239, e.g., to retrain and/or otherwise refine a previously trained machine learning model. Machine learning models may include any of the various examples disclosed herein and/or otherwise known to those skilled in the art.

Figure 2D:
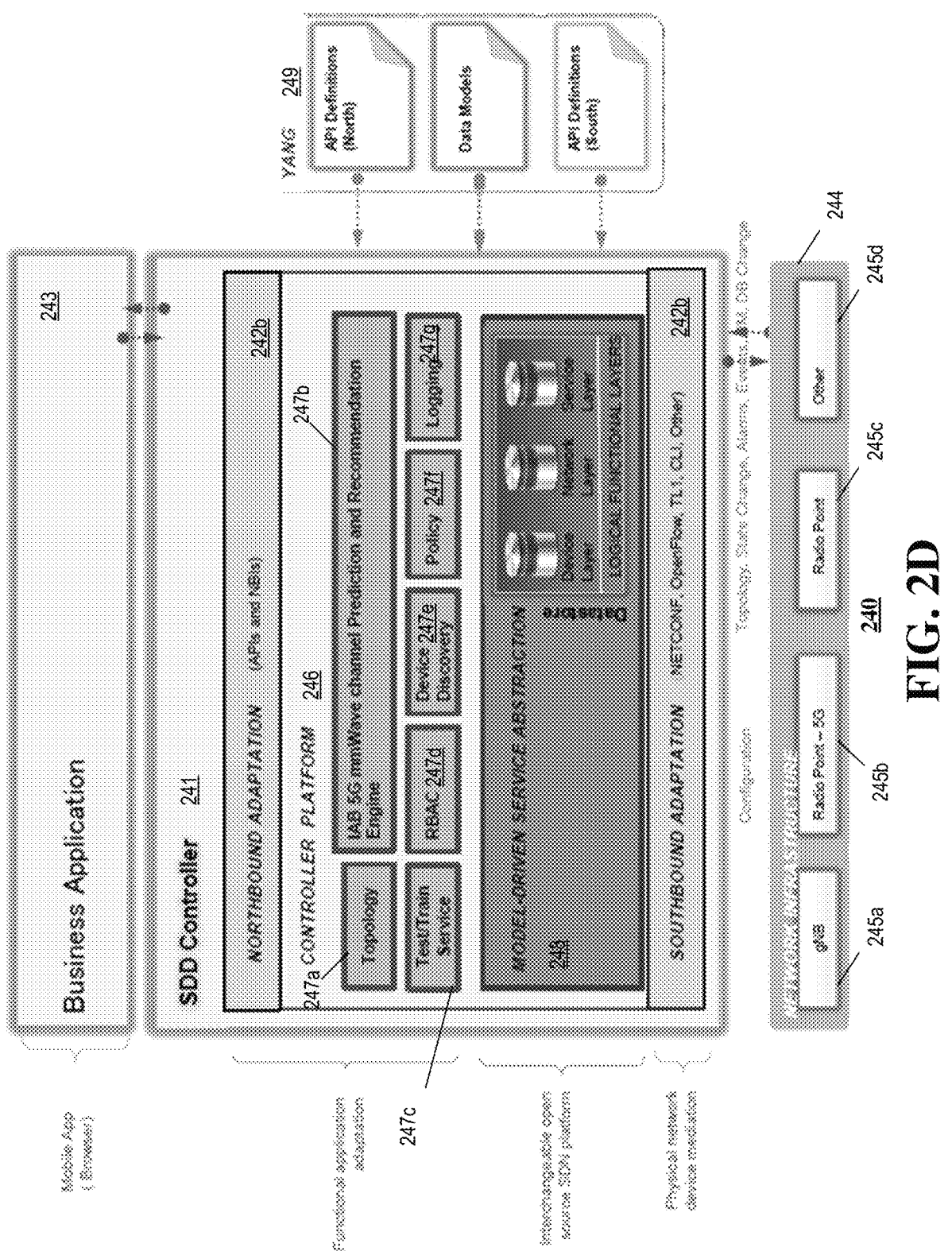
FIG. 2D is a block diagram illustrating an example, non-limiting embodiment of a domain controller functioning within the communication network of FIG. 1 and the IAB systems of FIGS. 2B-2C in accordance with various aspects described herein.

FIG. 2D is a block diagram illustrating an example, non-limiting embodiment of a domain controller 240 functioning within the communication network 100 of FIG. 1 and the IAB systems of FIGS. 2B-2C in accordance with various aspects described herein. When utilized in a software defined networking (SDN) environment, the domain controller 240 may include a software defined domain controller (SDDC) 241. The SDDC may facilitate a learning of physical characteristics of one or more network domains and/or creation of a database, which may be analyzed by applications for predicting future needs of network resources. The database may facilitate a provision of information that supports decisions, recommendations and/or predictions of the SDDC regarding future demands, for example, determining whether a current network domain(s) configuration would be sufficient to accommodate any estimates of future network demand and/or utilization. In at least some embodiments, the SDDC collects parameters at run time, using the collected data to learn characteristics of the access domain(s). The learning generally supports intelligence decisions regarding access network configuration, access network element and/or component configuration. According to the illustrative examples, the network domain comprises a mobile network access domain and/or a mobile network transport domain.

For example, the access domain may include an IAB system as may be employed in a 5G millimeter wave access network. The SDDC may observe, analyze, learn, configure and/or test configurations of one or more aspects of the IAB system, including but not limited to, operation of a radio point, an antenna, a base transceiver station, e.g., the example gNBs, channel allocation, and the like, thereby supporting smart and dynamic management of a spectrum, such as the 5G millimeter wave channels, during run time.

In at least some embodiments, the SDDC may include one or more of a topology manager, and an artificial intelligence (AI) and/or machine learning (ML) subsystem. The SDDC may be configured to train and/or test an AI and/or ML model to predict and/or otherwise recommend an intelligent and dynamic IAB backhaul configuration, e.g., operating in one or more millimeter wave spectrum channels. Configured wireless backhaul links of the IAB backhaul spectrum may have one or more of flexible modulation formats, adaptive forward error correction (FEC), a coherent multiple input multiple output (MIMO) receiver, a flexible data rate, a flexible data type, etc. In at least some embodiments, the IAB backhaul system may be configured to tune one or more of a channel, a channel bandwidth and/or to otherwise optimize the reachability.

For example, the SDDC 241 may be implemented according to SDN principles, being instantiated on one or more configurable hardware platforms and configured to accomplish the intended functionality as disclosed herein. In at least some embodiments, the SDDC 241 may be configured to monitor, configure and/or otherwise control an IAB system of a RAN. In this regard, the SDDC 241 may identify one or more of available IAB resources, a demand for IAB system resources, configurable parameters of the IAB resources. The SDDC 241 may be further configured to recommend and/or otherwise configure one or more IAB resources to accommodate the demand. Such configurations may include a planned IAB resource overhead. In at least some embodiments, the SDDC 241 may predict and/or otherwise forecast a fluctuating demand for IAB resources, recommending and/or initiating reconfigurations of IAB resources as may be necessary to accommodate changes in demand.

According to the illustrative example, the SDDC 241 is in communication with a network infrastructure 244, which may include elements of a RAN network. In at least some embodiments, the network infrastructure 244 include elements of an IAB system 200, 220, 230 as illustrated in FIGS. 2A, 2B and 2 2C. By way of example, and without limitation, the network infrastructure 244 may include one or more of a gNB 245*a*, a 5G radio point 245*b*, a radio point 245*c*, and/or other access network subsystems 245*d*. In this regard, the SDDC 241 may include a first interface to the network infrastructure 244 and a second interface to one or more applications, e.g., to an example business application 243.

The example first interface may include a southbound adaptation 242*a*, providing an interface to the network infrastructure 244. The southbound adaptation 242*a* may include a physical interface and/or logical interface, e.g., between the SDDC 241 and one or more elements of the network infrastructure 244. A logical interface may be adapted according to one or more protocols, e.g., to facilitate communication and/or interoperation of the SDDC 241 and the network infrastructure 244. Alternatively, or in addition, the southbound adaption 242*a* may be configured according to a NETCONF protocol defined by the IETF to install, manipulate, and delete the configuration of network devices. Other examples include, without limitation the OpenFlow communications protocol adapted to provide access to a forwarding plane of a network switch or router over a network. Still other examples may include Transaction Language 1 (TL1) management protocol and/or a command-line interface (CLI), e.g., intended for human users who interact directly with one or more devices of the example network infrastructure 244.

The example second interface may include a northbound adaptation 242*b*, e.g., providing an interface to one or more applications 243. The northbound adaptation 242*b* may include a physical interface and/or logical interface between the SDDC 241 and one or more applications, e.g., a business application as may be employed by a network operator to operate network resources according to one or more rules and/or policies. The logical interface may also be adapted according to one or more protocols. Alternatively, or in addition, the northbound adaption 242*b* may include one or more application programming interfaces (APIs) configured to facilitate communications between the SDDC 241 and the application(s) 243.

In at least some embodiments, the SDDC 241 includes a controller platform 246. The controller platform may include one or more of a topology module 247*a*, an IAB wireless channel prediction and/or recommendation engine 247*b*, a test/train service module 247*c*, a role-based access control (RBAC) module 247*d*, a device discover module 247*e*, a policy module 247*f* and/or a logging module 247*g*. The device discovery module 247*e* may be adapted to discover a topology of a RAN network, e.g., including a topology of gNB devices and/or or radio point devices that may be used in combination with the gNB devices.

The topology module 247*a* may identify one or more network elements, e.g., gNBs, as being capable of certain features, such as split operation according to an IAB application. In such instances, the topology module 247*a* may identify at least one gNB-CU and one or more other available gNB-DU as may be used in association with a donor gNB-CU. In at least some embodiments, the topology module 247*a* may identify, recommend, and/or otherwise configure one or more elements of the RAN. In particular, the topology module 247*a* may identify, recommend and/or otherwise recommend elements of an IAB system of a RAN, e.g., associating one or more gNB-DU with a gNB-CU to facilitate a wireless backhaul between the gNB-DU and a mobile core network via the gNB-CU.

The RBAC module 247*d* may restrict network access based on a role of an individual user, e.g., the user's role within an enterprise. For example, the RBAC module 247*d* may be used to manage portions of a RAN that may be set aside for a particular user, e.g., a large corporate campus, factory, and the like. In such instances, UE access to the RAN may be restricted by the RBAC module 247*d* to authorized users, such as employees and/or factory personnel.

The test and/or train service module 247*c* may be adapted to test one or more configurations of an IAB system as may be implemented by the topology module 247*a*. To the extent that the SDDC 241 is used in a machine learning application, the test and/or train service module 247*c* may be provide configuration and/or test results to a learning algorithm. The learning algorithm may be further adapted to configure and/or adapt a machine learning model, such that an application of a suitably trained model predicts results to within a desired accuracy. In at least some embodiments, the training may be accomplished based on a strategy that systematically configures and reconfigures an IAB system, testing the resulting configurations and updating training data based on the results. Alternatively, or in addition, the training may be accomplished and/or otherwise updated or reinforced based on results obtained during normal system usage.

The policy module 247*f* may be configured to identify, store and/or enforce one or more policies. Such policies may be applied to any aspect of operation of the SDDC 241. For example, a policy may be employed in managing operation of the RBAC module 247*d*, e.g., to associate RAN assets with a particular reserved portion of the network, and/or to ensure that special classes of users are provided access to the reserved portions, while others may be excluded.

In at least some embodiments, the logging module 247*g* may be configured to generate a record of and/or otherwise log one or more activities utilized and/or otherwise managed by the SDDC 241. For example, the logging module 247*g* may generate a record identifying one or more discovered RAN assets, parameters of RAN assets, observations of operation of RAN assets, measured and/or otherwise calculated, characteristics of a transport medium, such as a wireless channel, an air interface, one or more IAB system configurations, test results, and so on. Such records may be utilized by one or more other modules of the SDDC 241, and/or the application(s). For example, the IAB channel prediction and recommendation engine 247*b* may access topology information including configurations, parameters, prior results, calculated predictions and the like as inputs for generating a prediction and/or recommendation. Alternatively, or in addition, the test and/or train service module 247*c* may access similar information in generating training data and/or testing a trained model for accuracy, e.g., comparing predicted IAB system performance results to actual observed results.

In at least some embodiments, the IAB channel prediction and recommendation engine 247*b* may be configured to predict one or more characteristics of a wireless channel. Characteristics may include, without limitation, a separation distance, a power spreading loss, a gain profile, an absorption loss, a scattering, a dispersion profile, and the like. Changing air interface characteristics of network may cause a hindrance in launching a new wireless IAB channel, e.g., a new 5G millimeter wave channel. Alternatively, or in addition, changing interface characteristics may impact existing channels. It is understood that an addition of more high-capacity channels may result in other changes, such as changes to a refractive index characteristic of an air interface, e.g., due to nonlinearity. Still further changes may include changes to a noise characteristic, e.g., due to a requirement for more amplification. The SDDC 241 may facilitate a learning process to effectively learn one or more of the above parameters and/or air interface characteristics for an application, such as the example IAB system.

In at least some embodiments, the IAB channel prediction and recommendation engine 247*b* may be configured to calculate a spectral efficiency based on a number of symbols M and dimensionality N. For example, the spectral efficiency (SE) may be calculated according to example equation 1.

$$SE = \mathrm{Log}_2(M) \div (N/2) \qquad \text{Eq. 1}$$

In at least some embodiments, the IAB channel prediction and recommendation engine 247*b* may be configured to calculate an asymptotic power efficiency, e.g., a Euclidian distance between symbol points ($d_{min}$) based on a number of symbols M, an average symbol rate $E_s$, as illustrated in Eq. 3, and an average energy per bit $E_b$ as illustrated in Eq. 4. For example, the asymptotic power efficiency (APE) may be calculated according to example equation 2.

$$APE = \gamma = \frac{d_{min}^2}{4E_b} = \frac{d_{min}^2 \log_2(M)}{4E_s} \qquad \text{Eq. 2}$$

$$E_s = \frac{1}{M} \sum_{k=1}^{M} \|C_k\|^2 \qquad \text{Eq. 3}$$

$$E_b = E_s / \log_2(M) \qquad \text{Eq. 4}$$

In at least some embodiments, the IAB channel prediction and recommendation engine 247*b* may be configured to calculate a signal attenuation, e.g., a signal attenuation per unit length in decibel, as illustrated in Eq. 5, in which L is an optical length, $P_i$ is a launch power and $P_o$ is a received power.

$$\alpha_{db} * L = 10 \log_{10}\left(\frac{P_i}{P_o}\right) \qquad \text{Eq. 5}$$

Alternatively, or in addition, predictions may be directed to demand and/or usage requirements. It is understood that demand may vary according to may factors. For example, demand may fluctuate according to daily and/or weekly traffic patterns. Consider an IAB system supporting gNB-DU nodes along a roadway that may accommodate self-driving vehicles. As daily traffic patterns may include busy periods, e.g., rush hour, and quiet periods, it is understood that demand for utilization of the IAB system may vary accordingly, being greater during rush hour periods and lesser during intervening quite periods. Alternatively, or in addition, demand may vary according to events, which may include planned events, such as sporting events, holidays, conventions, and so on. In such instances, demand for utilization of the IAB system may surge during events. At least some events may be unplanned, such as weather events and/or other emergency events, such as fires, earthquakes, armed conflict, etc.

It is understood that fluctuations in demand may include one or more aspects, such as one or more of numbers of UE, mobility of UE, variations in supported UE applications, required QoS. Any of the various analytics and/or machine learning techniques disclosed herein may be utilized to observe, monitor, evaluate and/or otherwise predict or forecast demand for utilization of the IAB system. Demand may be associated with one or more IAB system characteristics that may be adapted to accommodate the demand. By way of nonlimiting example, IAB system characteristics may include one or more of wireless frequency bands, bandwidths, modulation types, gain profiles, antenna configurations, receiver sensitivities. Accordingly, the IAB channel prediction and recommendation engine 247*b* may be configured to predict demand and/or one or more characteristics of a wireless channel in view of an actual demand, a scheduled demand and/or a predicted or forecasted demand.

In at least some embodiments, the SDDC 241 includes a model-drive service abstraction module 248. The service abstraction module 248 may be adapted to generate and/or otherwise facilitate access to physical and/or logical function layers of the IAB system. The example service abstraction model 248 includes a datastore having information related to logical functional layers that may include one or more of a device layer, a network layer and/or a service layer.

In at least some embodiments, the train and/or test service module 247*c* and/or the IAB channel prediction and/or recommendation engine 247*b* may operate alone and/or in combination to obtain a solution including a configuration of an IAB system and/or management of corresponding frequency spectrum and/or channels. In at least some embodiments, the solution may be divided into three parts. A first part includes a data generation step in which relevant data may be gathered and/or collected. In at least some embodiments, the first part may include one or more computations, such as the example computations provided herein, e.g., in one or more of Equations 1-6. According to a second part, a machine learning (ML) and/or artificial intelligence (AI) may be applied. In at least some embodiments the ML and/or AI may include generating, modifying and/or otherwise building a model. The model may receive input, e.g., parameters and/or requirements, determine a relationship between input and outputs and capture the relationship in a manner that may be applied to other input values. According to a third part, the model may be utilized to process one or more input values to produce an output, e.g., a recommendation, based on a ML and/or AI captured within the model.

At a high level, the topology module 247*a* may capture network view, which may be referred to as at least a part of a topology. Once a topology has been identified, a first route may be selected route, e.g., from a source IAB node or network element to a destination IAB node or network element. The gNB, or more generally radio point, may have a set of selectable and/or otherwise configurable parameters. In such instances, a particular combination of parameters is selected and/or otherwise identified and applied to the first route. Once so configured, the link may be operated and/or otherwise modeled and/or simulated. Data may be collected and used alone or in combination with the configuration data to test and/or train.

Any and/or all computed, observed and/or otherwise measured resulting data may be collected and stored, e.g., at a database and/or a disk storage system. Systematically, a next set of parameters may be selected for the same route, which may be tested in a like manner, storing results as indicated. The process may be repeated in an exhaustive manner, until all parameters have been tested for the particular route. The IAB network topology may be examined to determine whether any other routes may exist. To the extent they do, the above process may be repeated for each of the other routes, until all routes have been evaluated. In at least some embodiments, the above process may be repeated responsive to a change in topology and/or after a specific interval of time.

According to the ML and/or AI model building, as may utilize a deep learning (DL) algorithm, the data generated from a gNB/radio-point and/or stored in a database, may be fed to a ML/DL engine. The database of gathered information may be used to perform analytics e.g., using continuously updated and/or otherwise learned network characteristics. Using learning from data sources, the SDDC may learn further to take decisions on launching a new channel in the IAB network, e.g., a new or fresh 5G millimeter wave channel. The ML/DL engine may identify and/or otherwise recommend a 5G millimeter wave channel, selected and/or otherwise configured according to increasing a spectral efficiency, e.g., maximizing and/or otherwise optimizing the spectral efficiency. The automated approach facilitates prediction and/or forecasting of future trends in bandwidth requirements, allowing the IAB system to be adapted to account for variations, such as seasonal surge in network traffic, e.g., during Olympic games, cricket, football world cup events, and the like.

By conducting such a learning process over a learning period, the SDDC may be adapted to predict and forecast a future demand in usage of the IAB network and/or future growth needs. In at least some embodiments, the SDDC may be configured to determine and/or otherwise provide billing and/or costing information for an on-demand traffic setup, in which the SDDC may identify a suitable 5G millimeter wave channel. For example, a reconfiguration may identify whether a RAN millimeter wave channel slice is available without channel movement. If so, then then the existing channel and/or slice may be allocated. However, if an available slice is not identified, then an algorithm may be performed to identify a millimeter wave channel slice, which may then be moved, preferably with little to no traffic impact. If enough millimeter wave channels slices are available in the spectrum for movement, then those channels may be identified and/or otherwise marked them for movement, e.g., according to a destination UE placement.

According to the usage of generated data for on-demand traffic prediction, recommendation and/or allocation of optimum IAB millimeter wave channels, the SDDC 241 may provide a recommendation, based upon ML model results, for a best frequency spectrum and/or channel for launching a millimeter wave channel on a gNB radio-point. During a launching of a new channel, the SDDC may automatically pick a number of channels and locations of those channels in a corresponding coverage area. It is understood that due to non-linearity and/or varying gain profiles, different channels may have varying properties. Generally, no two channels will have same gain profile and hence may have different reach. This would otherwise tend to complicate IAB system management, however, the techniques disclosed herein using the SDDC are able to pick one or more channels that are best suited for IAB management to ensure reachability and coverage area. In particular, the SDDC may be able to pick channel location and/or a number of channels required, based upon data collected from the gNB/radio-point and launch the channel.

Figure 2E:
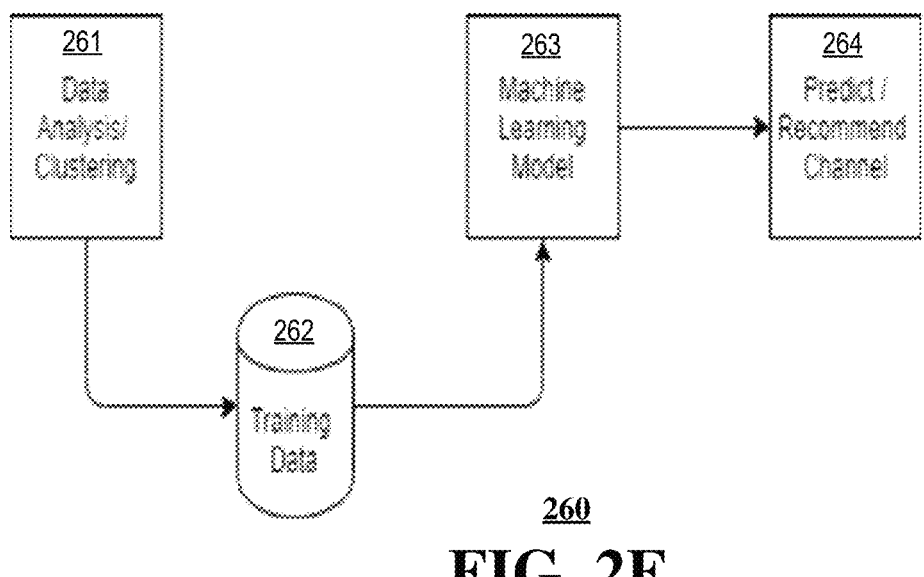
FIG. 2E is a block diagram illustrating an example, non-limiting embodiment of a machine learning system functioning within the communication network of FIG. 1 and the IAB systems of FIGS. 2B-2C in accordance with various aspects described herein.

FIG. 2E is a block diagram illustrating an example, non-limiting embodiment of a machine learning system 260 functioning within the communication network 100 of FIG. 1 and the IAB systems of FIGS. 2B-2C in accordance with various aspects described herein. The example machine learning system 260 includes a data analysis module 261, a training data repository 262, a machine learning model 263 and a recommendation engine 264. The recommendation engine 264 may be adapted to provide a recommended configuration of one or more aspects of an access domain, e.g., a RAN, of a mobile communication system. The recommendation configurations may include, without limitation, a recommended configuration of a fronthaul and/or backhaul portion of the access domain. For a RAN domain adapted for operation according to IAB, the recommended configuration may include one or more configurable paths from a base transceiver station to an access terminal or node in fixed communication with a mobility core network.

The point of entry may be one of the base transceiver stations arranged according to a fixed path, such as a hardwired or cabled communication, with the core network. It is understood that cabled communication may include, without limitation, an optical fiber, a coaxial cable, copper twisted pair. Alternatively, or in addition, the fixed path may include a line-of-sight wireless link, as may employ microwave signals and/or optical signals. In at least some embodiments, the fixed path may include a satellite communications link. In contrast, the configurable paths may include wireless links or hops between one or more base transceiver stations and the point of entry, according to a direct path and/or a relay path through multiple base transceiver stations.

The data analysis module 261 may collect data from one or more elements of the access domain, which may include identification and/or configuration data from one or more base transceiver stations, data from network provisioning records that may provide equipment types, features, capabilities, locations, configurations, and so forth. Alternatively, or in addition, the data may be collected from operation of the access network. For example, the access network may be configured according to an evaluation test plan. Once configured, the network may be operated, allowing one or more aspects of the network to be monitored. In such instances, the collected data may include one or more of a configuration of the test plane and associated monitored data, e.g., transmit power gains, antenna configurations, received signal levels, error rates, SNR, $E_b/No$ and the like. In at least some embodiments, the collected data may include ancillary information related to the test, such as time of day, day of week, season, environmental conditions, interference, and so on.

The data analysis may include, without limitation, summarizing results, e.g., whether a tested path supported operation according to a predetermined success criterion, was it reachable. Alternatively, or in addition, the data analysis may include discovery of patterns, organization of the collected data, clustering, and the like, representing data analysis results. The data analysis module 261 may provide one or more elements of the collected and/or the analysis results to a training data repository 262. The training data repository 262, in turn, may store and/or otherwise retain the collected data and/or data analysis results in a retrievable manner. For example, the training data repository 262 may include a matrix of test results and/or a collection of similar matrices according to IAB paths, equipment configurations, and the like. Alternatively, or in addition, the training data repository 262 may store the data in a database system.

The machine learning module 263 may employ one or more machine learning techniques. The machine learning technique(s) may utilize content of the training data repository 262 as training data. For example, certain stored records may identify a network configuration and a result that may include received signal levels, error rates, and/or summary results as to whether a particular node and/or path was reachable. The machine learning module 263 may be adapted to identify an input portion of the stored record, e.g., a system configuration and an output portion, e.g., a result of operating the system according to the particular configuration. The machine learning module 263 may formulate a predicted result based on the configuration. According to a training process, the predicted result may be compared to an actual result contained within the training record. The machine learning model 263 may be adapted based on a result of such comparisons. For example, an agreement of the predicted and actual results may represent positive feedback that the model is functioning properly, whereas a disagreement may represent negative feedback. In at least some embodiments, a difference between the predicted result and the actual result may be calculated and interpreted as an error value. It is understood that one or more adjustable features of the machine learning model 263 may be adapted based on the error value. In at least some embodiments, a training process may continue until a success criterion and/or error criterion is observed below a respective threshold.

In at least some embodiments, the data analysis module 261 may collect and/or analyze data of opportunity as may be gathered during routine operation of the access network. Data collected in such a manner may be utilized in an ongoing training process, e.g., allowing the machine learning model 263 to formulate a prediction based on the routine data collection and comparing predicted results to observed actual results.

Although the above examples describe data collection and model training in a context of configurating and operating an access network, it is understood that system may be applied to other data. For example, the data analysis module 261 may collect data relating to usage of the access network. Usage may include, without limitation, numbers of users supported, frequencies, frequency bands and/or channels utilized for communications with UEs and/or for IAB links, bandwidths, utilization, supported applications, user categories, e.g., average consumers, prioritized users, private network usage as may be supported by the access network. In at least some embodiments, the usage results may be stored along with ancillary information, such as time of day, day of week, physical location, events, including scheduled events, such as sporting events, conferences, and/or unscheduled events, such as storms, wildfires, and/or other civil emergencies.

The data analysis module 261 may analyze the collected data to obtain analysis results. For example, the analysis results may correlate usage patterns with ancillary information, types of users, applications, and the like. The analysis results may be stored, e.g., in the training data repository 262 and used to train a machine learning model, such as the example machine learning model 263. It is understood that in at least some embodiments, the machine learning module 263 may be the same one described above in relation to access network configuration and operation. Accordingly, the machine learning module 263 may be trained according to combinations of access network configuration and performance data as well as utilization and other ancillary information. Training may include using prescribed and/or scripted training data. Alternatively, or in addition, training may include using routine operational data to adapt, enhance and/or otherwise adjust the machine learning training model 265.

Figure 2F:
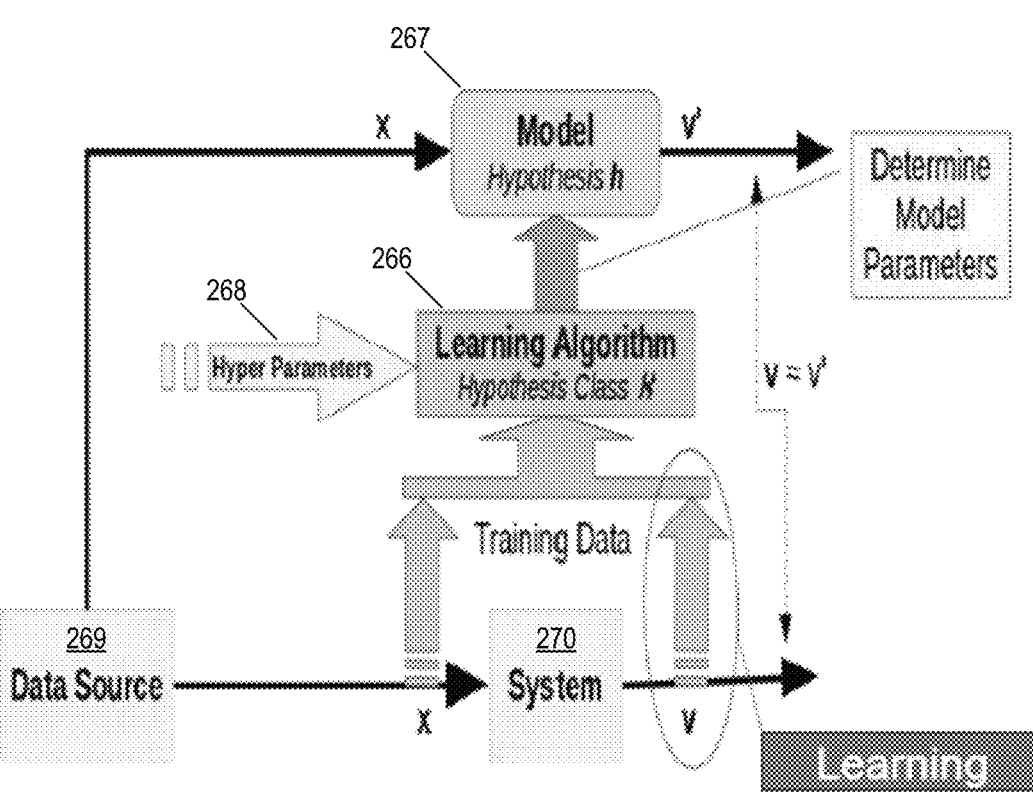
FIG. 2F is a block diagram illustrating another example, non-limiting embodiment of a machine learning system functioning within the communication network of FIG. 1 and the IAB systems of FIGS. 2B-2C in accordance with various aspects described herein.

FIG. 2F is a block diagram illustrating another example, non-limiting embodiment of a machine learning system 265 functioning within the communication network 100 of FIG. 1 and the IAB systems 200, 220, 230 of FIGS. 2B-2C in accordance with various aspects described herein. The example machine learning system 265 includes a learning algorithm 266 and a model 267. The model 267 may be initialized, modified, adapted and/or otherwise trained according to the learning algorithm 266. The model 267 receives input data from a data source 269, represented by "x," and generates a predicted output, represented by "v'." In at least some instances the data source 269 provides the same input data "x" to an actual system 270, to obtain an actual output "v." A set of training data may be generated according to a pairing of the actual input and output of the system 270, x and v. The training data may be processed by the learning algorithm 266 to obtain learned relationships between the actual and training data. In at least some embodiments, the model 267, may be adapted according to the learned relationships to apply a hypothesis to subsequent input data.

In at least some embodiments, a training process trains the model 267 according to an application of the learning algorithm 266, as may have been derived and/or otherwise configured from the training data. A trained model 267 may receive subsequent data from the data source 269 and provide a predicted output v' according to hypotheses of the trained model 267. In at least some instances, the same data from the data source 269 may be applied to the physical system 270 to obtain an actual output v. The actual output v may be compared to the predicted output v' to determine an error. To the extent the predicted and actual outputs agree the model 267 is suitably trained. However, to the extent the predicted and actual output disagree, the model 267 may require further training. In at least some embodiments, a tolerable error rate may be established as a threshold value, such that errors below the threshold may initiate further training, whereas errors above the threshold may not. Example error thresholds may be established according to an application, a particular access network, a network operator criterion, a customer criterion and so on. For example, an error threshold may be set at a percentage value, e.g., 80% or 90% success vs. 20% or 10% errors, such that a training process may be continued and/or otherwise initiated until the errors fall below the threshold.

It is understood that in at least some embodiments, the learning algorithm 266 may be adjustable via one or more hyper parameters 268. The hyper parameters 268 may be provide and/or otherwise modified responsive to an observed error rate. It is understood further that the training process may be performed once, e.g., during a system configuration period, periodically, e.g., responsive to an event, such as a system failure and/or reconfiguration, according to a schedule, e.g., periodically, such as hourly, daily, weekly, and so on. In at least some embodiments, the performance operation and/or training process may be performed in a substantially continuous manner, such that predictions provided by the model 267, may be implemented within the system 270 to obtain actual results that may be compared with predicted results as described above.

Figure 2G:
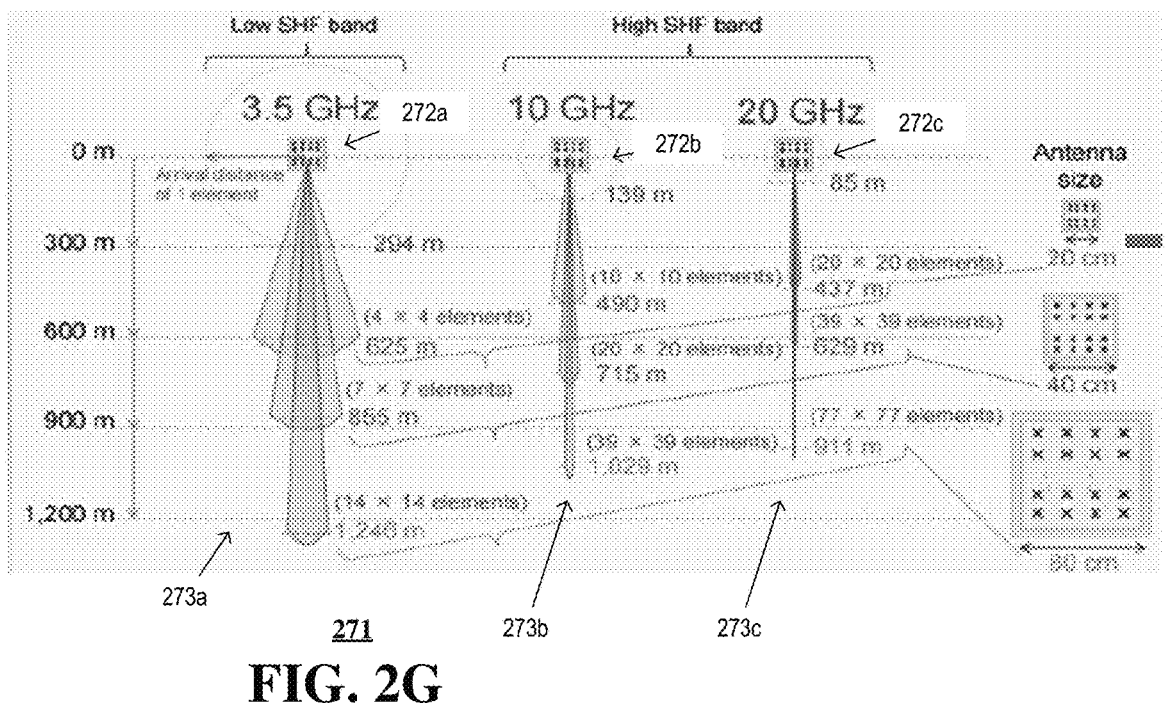
FIG. 2G is a graphical illustration of example antenna performance for different antenna configurations functioning within the communication network of FIG. 1 and the IAB systems of FIGS. 2B-2C in accordance with various aspects described herein.

FIG. 2G is a graphical illustration of example antenna characteristics 271 for different antenna configurations functioning within the communication network of FIG. 1 and the IAB systems of FIGS. 2B-2C in accordance with various aspects described herein. A first antenna 272a may be operated in a first, relatively low frequency band, e.g., the low SHF band at about 3.5 GHZ. In a first configuration, the first antenna 272a may include 4×4 antenna element array with an overall size of about 20 cm×20 cm, with a first radiation pattern 273a having a relatively broad beamwidth and a reach of about 625 m. In a second configuration, the first antenna 272a may include 7×7 element array with an overall size of about 40 cm×40 cm, with the first radiation pattern 273a having a relatively narrow beamwidth and a reach of about 855 m. In a third configuration, the first antenna 272a may include 14×14 element array with an overall size of about 80 cm×80 cm, with the first radiation pattern 273a having an even narrower beamwidth and an extended reach of about 1,246 m. Generally, an increased number of antenna elements many be more easily realized and/or utilized with decreasing wavelength.

A second antenna 272b may be operated in a second, relatively high frequency band, e.g., in a lower portion of the high SHF band, at about 10 GHZ. In a first configuration, the second antenna 272b may include 10×10 antenna element array with an overall size of about 20 cm×20 cm, with a second radiation pattern 273b having a relatively broad beamwidth and a reach of about 490 m. In a second configuration, the second antenna 272b may include 20×20 element array with an overall size of about 40 cm×40 cm, with the second radiation pattern 273b having a relatively narrow beamwidth and a reach of about 715 m. In a third configuration, the second antenna 272b may include 39×39 element array with an overall size of about 80 cm×80 cm, with the second radiation pattern 273b having an even narrower beamwidth and an extended reach of about 1,029 m.

Likewise, a third antenna 272c may be operated in a third, relatively high frequency band, e.g., in an upper portion of the high SHF band, at about 20 GHz. In a first configuration, the third antenna 272c may include a 20×20 antenna element array with an overall size of about 20 cm×20 cm, with a third radiation pattern 273c having a relatively broad beamwidth and a reach of about 437 m. In a second configuration, the third antenna 272c may include a 39×39 element array with an overall size of about 40 cm×40 cm, with the third radiation pattern 273c having a relatively narrow beamwidth and a reach of about 629 m. In a third configuration, the third antenna 272c may include a 77×77 element array with an overall size of about 80 cm×80 cm, with the third radiation pattern 273c having an even narrower beamwidth and an extended reach of about 911 m. It is understood that one or more of the antenna size, the number of antenna elements and/or the operating frequency range may be used as parameters, e.g., presuming the parameters correspond to the antennas utilized in the IAB. The illustrative examples reflect a low transmit power, e.g., about 2 Watts, at different frequencies.

Figure 2H:
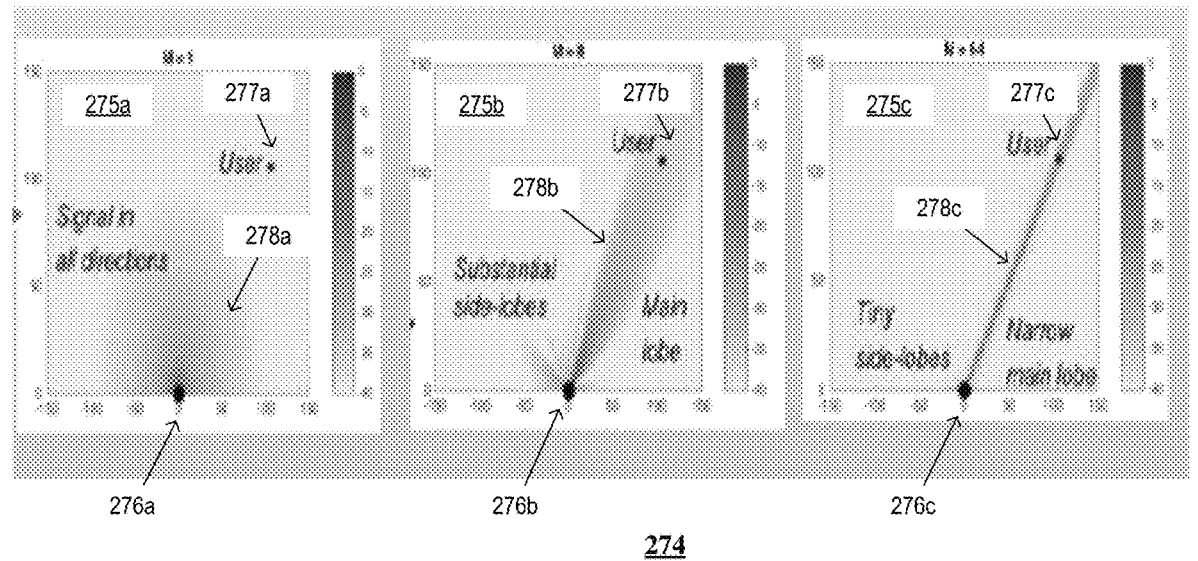
FIG. 2H is a graphical illustration of example antenna performance for different antenna configurations functioning within the communication network of FIG. 1 and the IAB systems of FIGS. 2B-2C in accordance with various aspects described herein.

FIG. 2H is a graphical illustration of example antenna performance 274 for different antenna configurations functioning within the communication network of FIG. 1 and the IAB systems of FIGS. 2B-2C in accordance with various aspects described herein. The examples represent antennas with M antenna elements. An antenna array gain $G_a$ may be estimated according to Eq 6.

$$G_a = 10 \cdot \log_{10}(M) \qquad \text{Eq. 6}$$

In a first frame 275a, a first antenna 276a includes an array having a single antenna element, i.e., M=1. The first antenna 276a provides a first coverage pattern 278a that extends from the antenna 276a, substantially equally in all directions within the plane of the page. An example user 277a is shown in reference to the first coverage pattern 278a, in which a corresponding gain profile would be relatively weak. A shading indicates a pathloss in db. The higher the gain in one direction, the less leakage, and/or interference, is experienced in other directions. It is worth noting here that pathloss and antennas size is frequency dependent.

In a second frame 275b, a second antenna 276b includes an array having eight individual antenna elements, i.e., M=8. The second antenna 276b provides a second coverage pattern 278b that extends from the antenna 276b, having a preferred direction. According to a configuration of the second antenna 276b, e.g., a tuning and/or steering, the relatively directive beam may be directed towards the user 277b. According, the example user 277b is shown in reference to the second coverage pattern 278b, in which a corresponding gain profile would be relatively strong. However, arrays with a few antennas still show relatively large side lobes.

In a third frame 275b, a third antenna 276c includes an array having 64 individual antenna elements, i.e., M=64. The third antenna 276c provides a third coverage pattern 278c that extends from the third antenna 276c, having a highly preferred direction. According to a configuration of the third antenna 276c, e.g., a tuning and/or steering, the highly directive beam may be directed towards the user 277c. According, the example user 277c is shown in reference to the third coverage pattern 278c, in which a corresponding gain profile would be strong. It is envisioned that other antenna types, arrays and/or array configurations may be used to determine other antenna gain profiles with respect to one or more users 277a. 277b, 277c, generally 277. It is understood that a radiation pattern of the highly directive antenna 276c may support spatial diversity in which the same frequency may be used to communicate with another user (not shown) in another direction from the antenna 276c.

It is understood that large amount of data, e.g., counters, statistics, failure information may be available with layers 1-3 of protocol stacks of eNB, gNB, gNB-CU, gNB-DU. The data may be collected and used for data features of the RAN. Models may be generated according to machine learning and/or abstraction to enable intelligent management and/or control of the RAN. For example, such control may be accomplished using one or more of data analytics, artificial intelligence (AI) and/or machine learning (ML). Some of the example models include, without limitation, network spatial-temporal traffic patterns, user mobility patterns, service type/patterns along with the corresponding prediction, network quality of service (QOS) prediction patterns, massive MIMO parameters configuration.

Example of at least some parameters that may be considered for any RAN planning applications are provide below in Table 1.

TABLE 1

| Example Parameters for Different Deployment Scenarios | | | |
| --- | --- | --- | --- |
| Deployment Scenario | 5G Macro | 5G Small Cell (Micro) | 5G Fixed Wireless |
| Spectrum | <6 GHz | ~3-30 GHz | ~30-100 GHz |
| Bandwidth | ~5-100 MHz | ~50-400 MHz | ~400-2,000 MHz |
| Mobility | High | Low | Stationary |
| Duplexing | FDD/TDD | TDD | FDD/TDD |
| Waveform | CP-OFDMA/DFT-S-OFDM | CP-OFDM | TDMA based OFDM |
| User Density | Medium | High | Low |
| # Simultaneous Users | Tens of UEs in a large coverage area | Few UEs in a small coverage area | One UE at a time |
| Channel Characteristics | Rich multipath | Few propagation paths | Few propagation paths |
| Spectral Efficiency | High (spatial multiplexing) | Low (few UEs, large path loss) | Low (few UEs, large path loss) |
| MIMO | Exploit spatial multiplexing SU- and MU-MIMO Up to 8 × 8 | Exploit beamforming SU- and MU-MIMO Medium rank | Exploit beamforming SU- and MU-MIMO Low rank |
| Antenna Elements | Up to 32/64 | Up to 256/256 | Up to 256/256 |
| Transceiver Design | Digital | Hybrid | Analog |

Figure 2I:
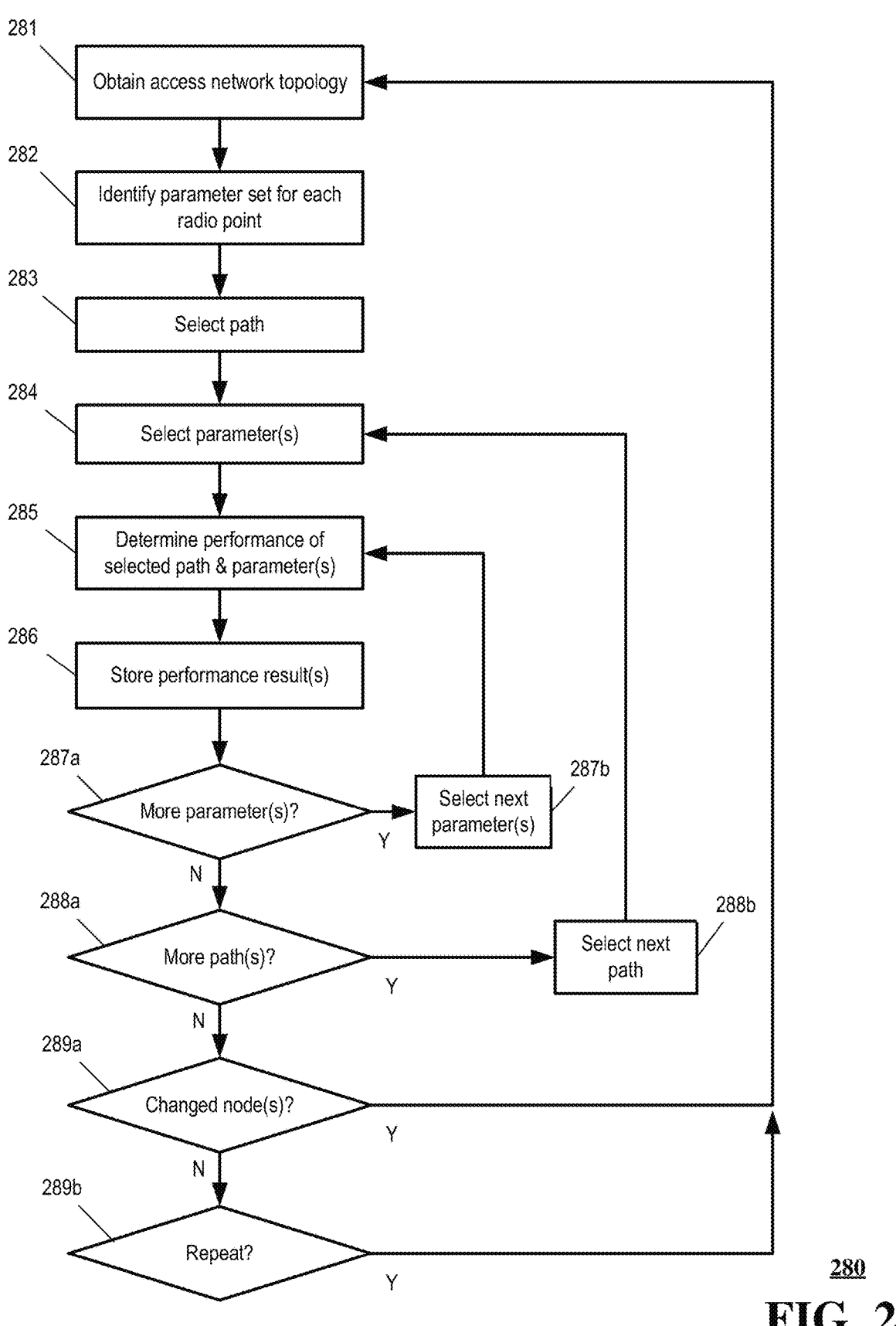
FIG. 2I depicts an illustrative embodiment of an example process for managing an IAB system functioning within the communication network of FIG. 1 and the IAB systems of FIGS. 2B-2C in accordance with various aspects described herein.

FIG. 2I depicts an illustrative embodiment of an example process 280 for managing an IAB system functioning within the communication network of FIG. 1 and the IAB systems of FIGS. 2B-2C in accordance with various aspects described herein. A topology of the access network may be obtained at 281. The topology may include, without limitation, identities and/or other suitable references of base transceiver stations. For example, base transceiver station identifiers may include any identifiable reference as may be used by a system operator to manage and/or otherwise track network assets. Alternatively, or in addition, the topology may include characteristics of the base transceiver stations. Base transceiver station characteristics may include, without limitation, a technology, protocol, and/or other distinguishable technical trait. For example, a base transceiver station characteristic may associate an identified device with a type of base transceiver station, e.g., a 4G eNodeB (eNB), a 5G gNB, and/or whether a 5G gNB device may be characterized as a centralized unit, gNB-CU and/or a distributed unit, gNB-DU. It is understood that in at least some embodiments, a network topology of a RAN domain may include physical locations of the base transceiver stations, e.g., the gNB-CU and gNB-DUs, and/or a logical network location.

Identify parameter set for each radio point at 282. A base transceiver station may include a radio, e.g., a transmitter, a receiver and/or a transceiver. The radio may be configured to support wireless communications with one or more other devices, such as the UEs and/or other base transceiver stations, as in an IAB configuration discussed herein. The wireless communications may include a downlink, in which wireless transmissions are directed from the base transceiver to the UE. Alternatively, or in addition, the wireless communications may include an uplink, in which a UE transmission is received at the base transceiver station. The radio may have one or more capabilities, such as one or more transmitter performance characteristics, such as transmit power levels, operational frequency ranges, bandwidths, modulation technologies, and the like. Alternatively, or in addition, the radio may have one or more receiver performance characteristics, such as receiver sensitivities, operational frequency ranges, bandwidths, modulation technologies, and the like.

It is further understood that in at least some embodiments, the radio may be in communication with one or more antennas, e.g., used to engage in the wireless communications. The antennas may have characteristics, such as antenna size, operational frequency range, bandwidth, efficiency, gain, directivity, and the like. In at least some instances, the antenna characteristics may be referred to as a gain profile, e.g., a gain, beamwidth, direct, peak-to-sidelobe ratio, sidelobe level, and the like.

According to the example process 280, an IAB path may be selected at 283. In some embodiments, the path may be selected according to pairwise combinations of the individual base transceiver stations, e.g., selected pairs of gNB-DUs. It is understood that IAB paths may include a single gNB-DU in wireless communication with the gNB-CU, which is in further communication with a mobility core network. Alternatively, or in addition, an IAB path may include at least one gNB-DU acting as a donor, in which the donor gNB-DU is in communication, e.g., in a relay fashion, between a terminal gNB-DU and the gNB-CU. To the extent pairs of gNB-DUs are considered, they may be evaluated and/or otherwise observed independently, such that relay IAB configurations may be characterized by combinations of the corresponding pairs of gNB-DUs.

For each selected path, one or more of the aforementioned parameters, e.g., characteristics of the base transceiver stations, may be selected at 284. For example, an operational frequency or channel may be selected, along with a transmit power level, a receiver sensitivity, antenna gain profiles, e.g., including contributions from each antenna of a pair of nodes, and so on. In at least some embodiments, parameters may include link parameters, such as absorption losses as may be estimated and/or otherwise observed. It is understood that absorption losses may vary according to environmental conditions, e.g., seasonal conditions, such as humidity, rain, snow, such that selected absorption parameters may include variations in absorption losses.

A performance of the selected path may be evaluated, estimated, observed and/or otherwise determined at 285, e.g., according to the selected parameter(s). It is understood that the performance may be characterized according to one or more performance metrics determined according to one of a calculation, a measurement, or a combination of a calculation and a measurement. In at least some embodiments, a calculation may be based on one or more of a distance between the path endpoints, a gain profile, absorption losses along the path, scattering, e.g., Rayleigh scattering, Mic scattering, and the like, a dispersion profile, air interface characteristics, e.g., precipitation conditions, and the like. In at least some examples, the performance metric(s) may be determined according to a link budget calculation. For example, a link budget calculation may determine a link performance metric, such as a received signal level, a signal-to-noise ratio (SNR), a signal-plus-interference-to-noise ratio (SINR), an energy-per-bit to noise power spectral density ratio (Eb/No), and the like.

Performance based on measurements may include configuring one or more endpoints of a selected path according to the selected parameters. Once configured, the path may be operated in one direction, e.g., from a UE facing node to gNB-CU facing node, or in another direction, e.g., from the gNB-CU facing node to the UE facing node, or in both directions. In at least some embodiments, the measurements may be based on actual packets and/or test packets sent in one or both directions along the selected path. Measurement based performance metrics may include any metric suitable for evaluating a performance of the path, such as any one or more of the aforementioned, calculated performance metrics.

It is understood that performance metrics may include technical values, such numerical values of transmit signal power, received signal levels, SNR, SINR, $E_b$/No and the like. Alternatively, or in addition, the performance metrics include a summary result, e.g., whether the selected path is "reachable" according to the IAB in view of the selected parameters. Reachability may include, without limitation, that a particular path, given node positions, separation distance and selected parameters, yields a performance metric deemed suitable for operation. It is understood that in at least some embodiments, suitability may be based on one or more of an application type, a data rate, a required quality of service (QOS), a subscription level, and/or other operator policies.

In at least some embodiments the resulting performance metrics may be stored at 286. Storage may be performed in a retrievable manner, such that an operator and/or an IAB controller, may access the stored results to identify and/or otherwise select a preferred configuration of an IAB network. In at least some embodiments, the performance metrics may be stored in a database that may be accessible to the operator and/or an IAB controller. The stored results may include one or more of the identities of the path segment nodes or endpoints, configuration parameters, detailed technical performance metrics, summary performance metrics, and the like. In at least some embodiments, the stored results may include other information as may relate to a time and/or date at which the results were obtained, a number of times the results may have changed, e.g., according to subsequent evaluations, a trend in performance, and so on.

In at least some embodiments, the process 280 is conducted in an exhaustive manner to consider all possible paths, operating under all possible configurations, e.g., according to the selected parameters. A scope of the nodes for consideration may be determined, e.g., according to an operational area, e.g., a coverage area of a particular gNB, a geographic location, a range from some reference, such as the gNB-CU, and so on. Accordingly, the example process 280 may determine at 287a, whether there are any untested parameters. To the extent it is determined at 287a that there are more untested parameters, select a next parameter at 287b, and continue with the process 280 from step 285. Otherwise proceed to determine if there are more untested paths at 288a. To the extent it is determined at 288a that there are more untested paths, select a next path at 288b, and continue with the process 280 from step 284.

It is anticipated that the performance results may be subject to change for one or more reasons, such as different times of day, different days of the week, different seasons, equipment variations, aging, failures, and/or any other changes to RAN configuration. Understanding such possibilities, the process 280, in at least some embodiments, may include one or more provisions to repeat at least a portion of the calculations, storing any updated performance results. For example, a determination may be made at 289a as to whether a configuration of network nodes has changed, e.g., by adding one or more new nodes, by removing one or more previously considered nodes, and/or by otherwise modifying one or more of the previously considered nodes. Node modifications may include, without limitation, changes to one or more of the parameters, e.g., as may result from an antenna upgrade, a radio upgrade, and the like. Detection of changes to the nodes may be recognized by a presence, absence, and or content of status messages as may be provided by the nodes, e.g., during normal operation of the IAB and/or the RAN. Alternatively, or in addition, changes may be recognized from an inspection of RAN provisioning records, RAN operation and maintenance records and/or input from network planners and/or network operators. To the extent it is determined at 289a that a configuration of the network nodes has changed, at least a portion of the process 280 may repeated, e.g., continuing from step 281.

In at least some embodiments, the example process 280 may be repeated. In this regard, a determination may be made at 289b whether the process should be repeated. To the extent it is determined at 289b that the process should be repeated, the process may repeat, e.g., continuing from step 281. For example, in some embodiments, the process 280 may be repeated periodically, e.g., once or more a day, once or more a week, once a month, season, year, etc. Such repetitions may occur according to a predetermined schedule, e.g., an operation and/or maintenance schedule. Alternatively, or in addition, the process 280 may be repeated responsive to an event, such as a maintenance event, e.g., an error, an observed change in usage characteristics. In at least some embodiments, the process 280 may repeated on demand, e.g., as may be requested by an operator.

Figure 2J:
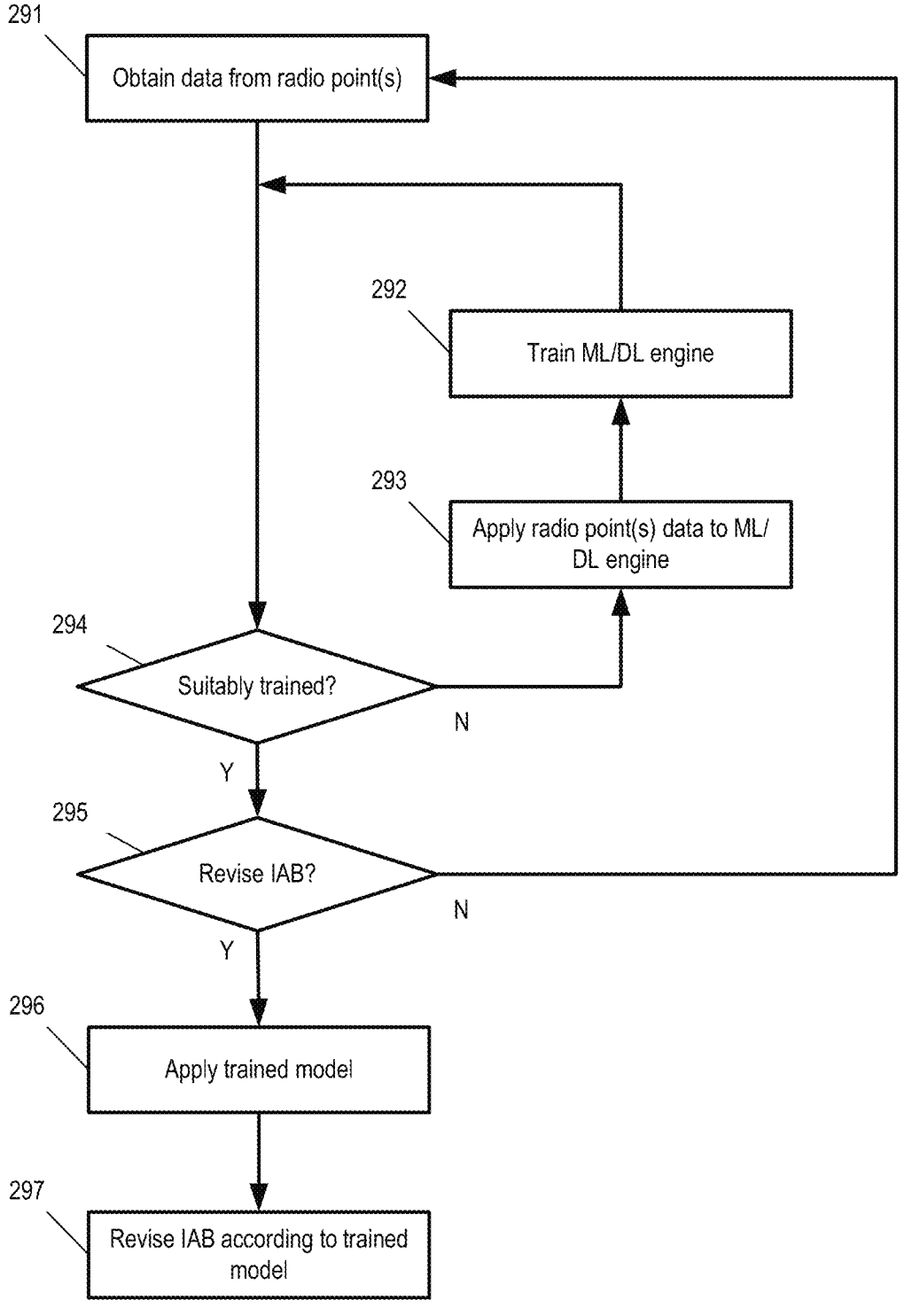
FIG. 2J depicts an illustrative embodiment of another example process for managing an IAB system functioning within the communication network of FIG. 1 and the IAB systems of FIGS. 2B-2C in accordance with various aspects described herein.

FIG. 2J depicts an illustrative embodiment of another example IAB management process 290 for managing an IAB system functioning within the communication network 100 of FIG. 1 and the IAB systems of FIGS. 2B-2C in accordance with various aspects described herein. According to the IAB management process 290, data is obtained from radio point(s) at 291. Data may include any of the various parameters disclosed herein, such as identifying data, e.g., a reference name, a network address, a physical location, e.g., geocoordinates and/or height, a software version, an operational parameter, such as a radio type, available modulation techniques, transmit power levels, an antenna type and/or antenna configuration parameters, operational frequency band(s) and/or bandwidth, receiver sensitivity, noise floor, noise figure, operational protocol(s) and the like.

In at least some embodiments, the IAB management process 290 incorporates machine learning, which may include training a model, e.g., to recommend a RAN configuration based on an actual and/or anticipated network demand. To the extent that the IAB management process 290 utilizes a machine learning model, a determination may be made at 294 as to whether the model is suitably trained. To the extent it is determined that the machine learning model is not suitably trained, the process 290 may apply radio point data to a machine learning engine at 293. The machine learning engine may, in turn, train the machine learning engine at 292. After training, the process may return to determine whether the machine learning model is suitably trained at 294. To the extent it is not, the training loop may be repeated until it is determined at 294 that the machine learning model has been suitably trained. Training may include any of the various examples disclosed herein and/or otherwise known to those skilled in the art of machine learning.

Continuing with the example IAB management process 290, a determination may be made at 295 as to whether a configuration of the RAN, which may include a configuration of the IAB, should be revised. To the extent it is determined that the RAN configuration does not need to be revised, the IAB management process 290 may repeat from step 291, e.g., obtaining subsequent data from the radio points at 291, evaluating the trained model, revising the model as may be necessary and reapplying the model. To the extent it is determined that the IAB does need to be revised, the IAB management process 290 may apply the trained model at 296. The process 290 may next proceed to revise the IAB according to the trained model 297.

The disclosed techniques include systems, devices, processes and/or software to facilitate adaptability and flexibility of a backhaul network that utilizes wireless backhaul segments for on demand traffic needs. Such needs may result from sudden surges on network traffic and configure the backhaul network strategically to manage peak hour traffic needs. Beneficially, the disclosed techniques permit a current backhaul network to learn from past experiences, e.g., to anticipate surges in extra bandwidth needs due to specific occasions. In at least some situations, a backhaul network may require dedicated bandwidth for a particularly large event, such as a world cup match and/or Olympic games. Bandwidth demand for traffic may also increase high during festival seasons, such as New Year, Christmas, Diwali etc.

While for purposes of simplicity of explanation, the respective processes are shown and described as a series of blocks in FIGS. 2I and 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
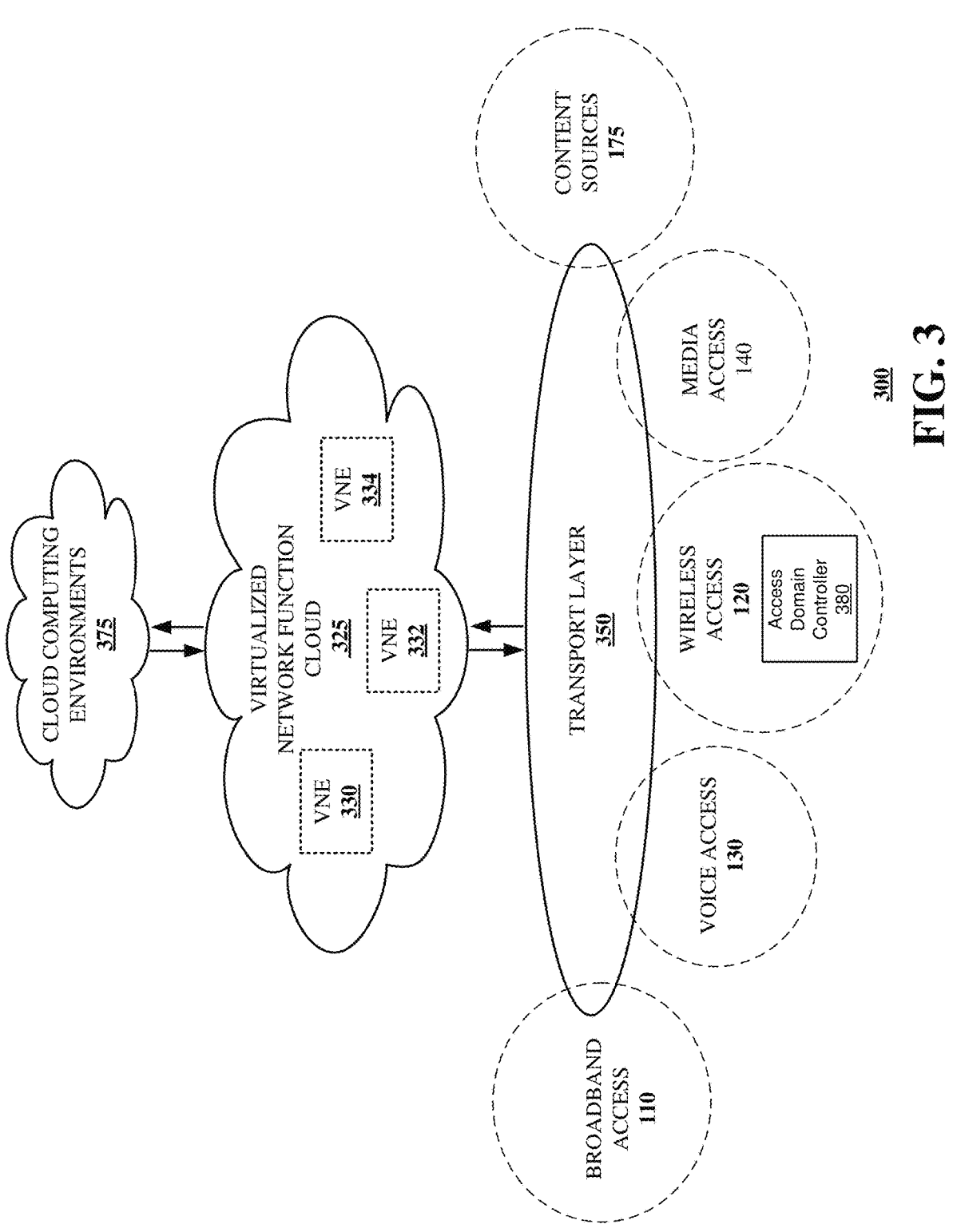
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of systems 200, 220, 230, 240 and processes 280, 290 presented in FIGS. 1, 2A, 2B, 2C. 2D, 2E, 2F, 2G, 2H, 2I, 2J and 3. For example, virtualized communication network 300 can facilitate in whole or in part discovering a network topology of an RAN having an integrated access backhaul (IAB) configured for operation in a millimeter wave spectrum, for identifying operational parameters of RAN nodes, and for applying a machine learning approach to train a model based on observations of RAN performance in view of the discovered topology and operational parameters. A configuration of the IAB, including operating channels and/or bandwidth may be determined according to the trained model to address a backhaul requirement.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

According to the illustrative example, the wireless access 120 may be adapted to include an access domain controller 380. The access domain controller 380 may include an IAB system controller that may include an SDDC configured according to one or more of the various techniques herein to gather information, to train a machine learning model and to apply a trained model to provide recommendations for IAB system operation and/or identification for IAB system growth requirements.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall, which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
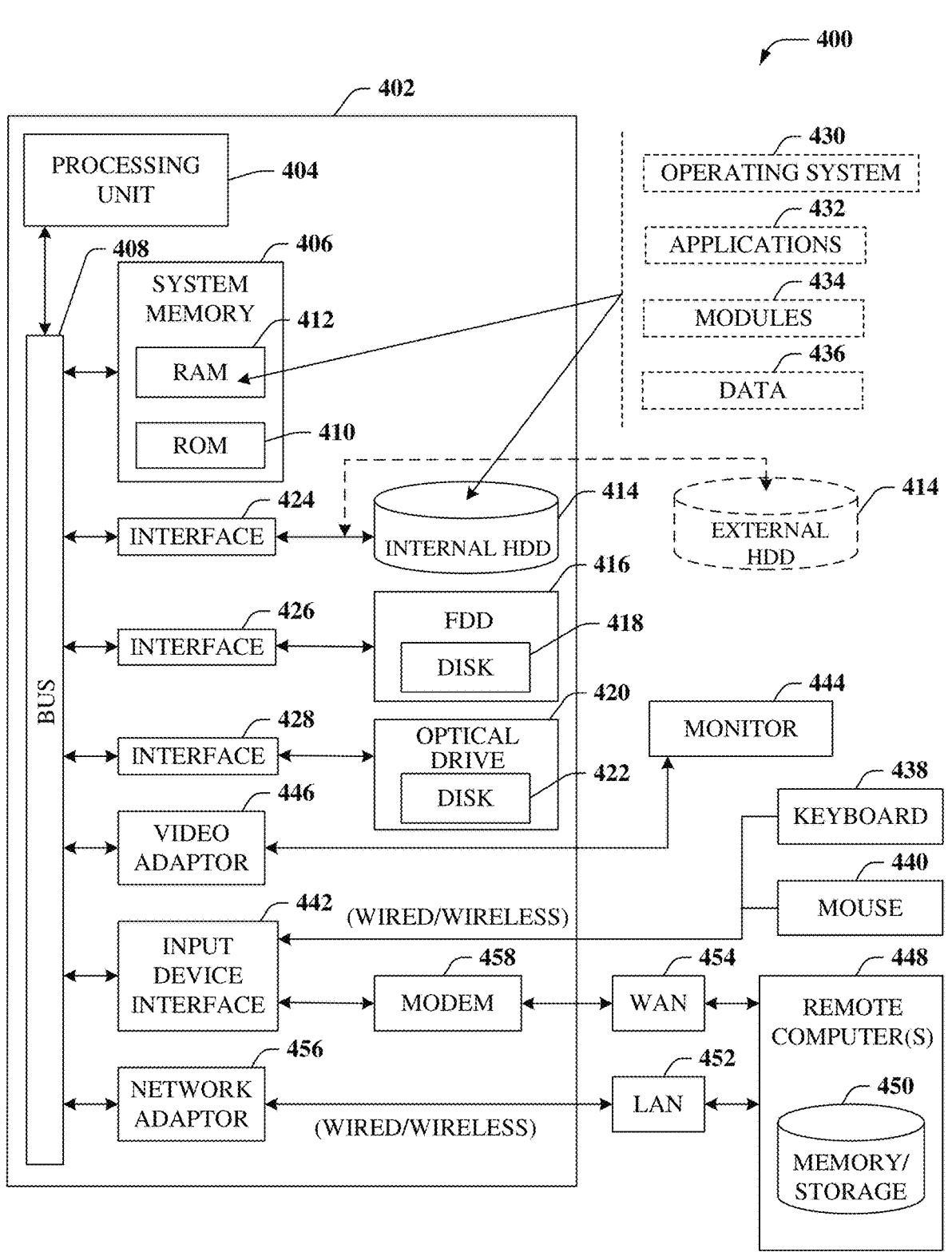
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part discovering a network topology of an RAN having an integrated access backhaul (IAB) configured for operation in a millimeter wave spectrum, for identifying operational parameters of RAN nodes, and for applying a machine learning approach to train a model based on observations of RAN performance in view of the discovered topology and operational parameters. A configuration of the IAB, including operating channels and/or bandwidth may be determined according to the trained model to address a backhaul requirement.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual micropro- cessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alter- native embodiments, a monitor 444 can also be any display device (e.g., another computer having a display, a smart phone, a tablet computer, etc.) for receiving display infor- mation associated with computer 402 via any communica- tion means, including via the Internet and cloud-based networks. In addition to the monitor 444, a computer typi- cally comprises other peripheral output devices (not shown), such as speakers, printers, etc.

The computer 402 can operate in a networked environ- ment using logical connections via wired and/or wireless communications to one or more remote computers, such as a remote computer(s) 448. The remote computer(s) 448 can be a workstation, a server computer, a router, a personal computer, portable computer, microprocessor-based enter- tainment appliance, a peer device or other common network node, and typically comprises many or all of the elements described relative to the computer 402, although, for pur- poses of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the com- puter 402 can be connected to the LAN 452 through a wired and/or wireless communication network interface or adapter 456. The adapter 456 can facilitate wired or wireless com- munication to the LAN 452, which can also comprise a wireless AP disposed thereon for communicating with the adapter 456.

When used in a WAN networking environment, the com- puter 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program mod- ules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
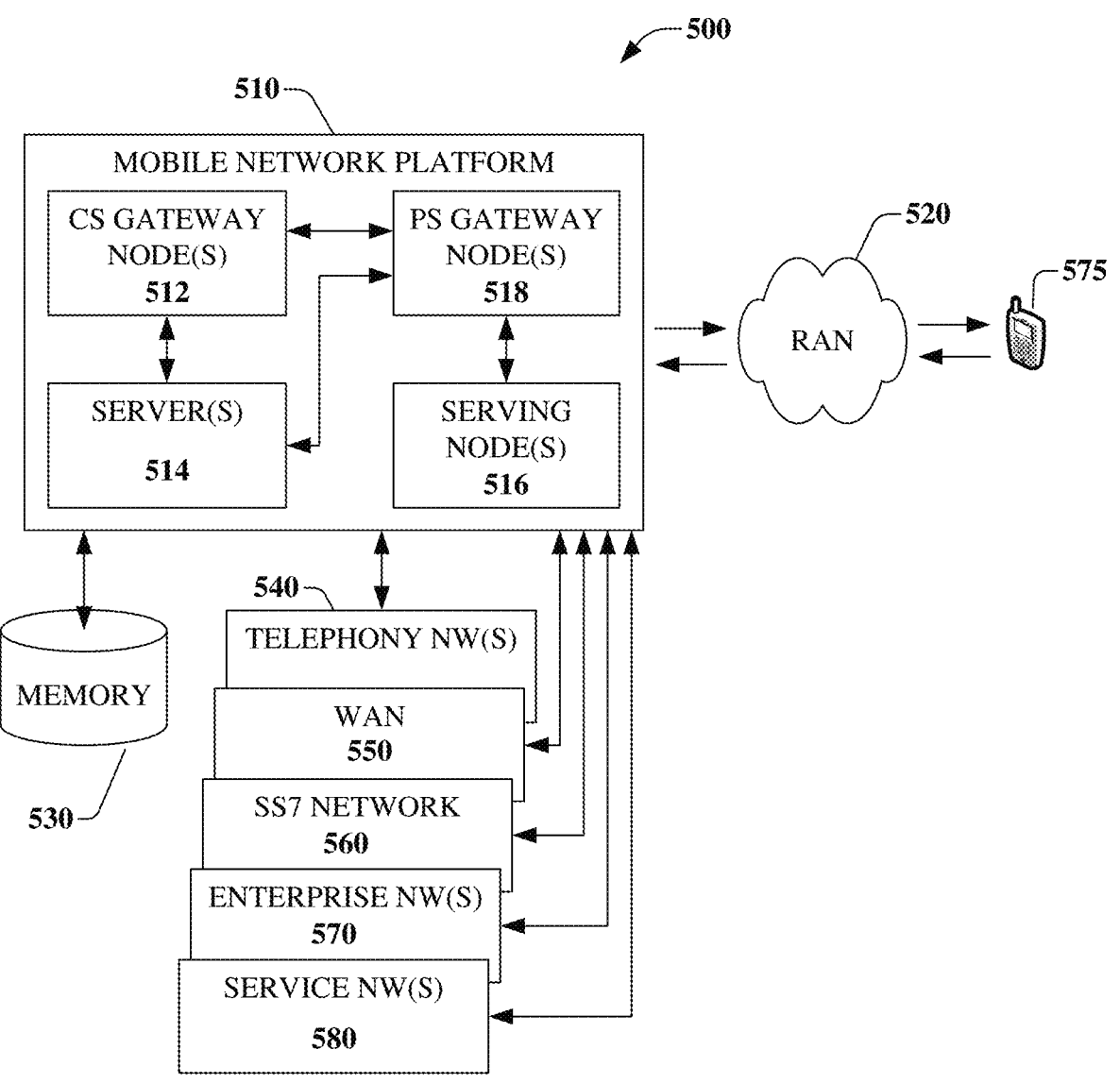
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part discovering a network topology of an RAN having an integrated access backhaul (IAB) configured for operation in a millimeter wave spectrum, for identifying operational parameters of RAN nodes, and for applying a machine learning approach to train a model based on observations of RAN performance in view of the discovered topology and operational parameters. A configuration of the IAB, including operating channels and/or bandwidth may be determined according to the trained model to address a backhaul requirement. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
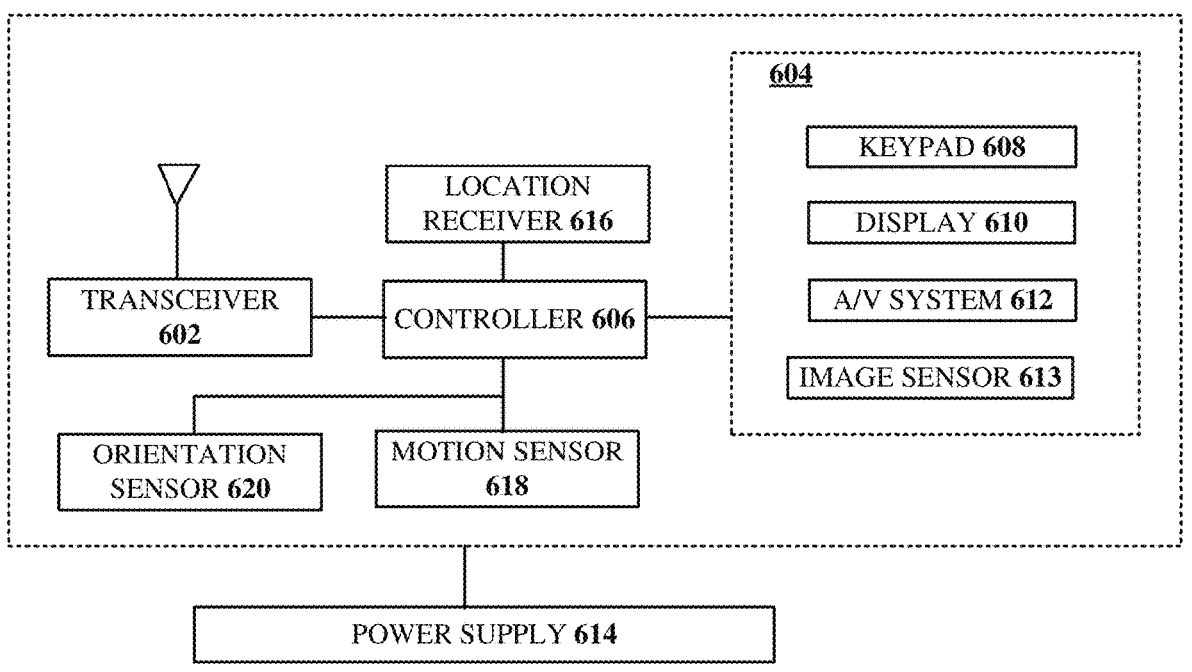
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part discovering a network topology of an RAN having an integrated access backhaul (IAB) configured for operation in a millimeter wave spectrum, for identifying operational parameters of RAN nodes, and for applying a machine learning approach to train a model based on observations of RAN performance in view of the discovered topology and operational parameters. A configuration of the IAB, including operating channels and/or bandwidth may be determined according to the trained model to address a backhaul requirement.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, X=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer." "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    discovering, by a processing system including a processor, a network topology of a radio access network (RAN) domain of a 5G wireless communication system, the RAN domain comprising a plurality of gNodeB distributed units (gNB-DUs) and a gNodeB centralized unit (gNB-CU), the plurality of gNB-DUs configured for wireless communication with the gNB-CU;
    obtaining, by the processing system, a plurality of observations of operation of the RAN domain configured to deliver 5G wireless communication services to a plurality of wireless communication devices via a least one gNB-DU of the plurality of gNB-DUs, wherein the 5G wireless communication services utilize an integrated access backhaul (IAB) network of the RAN domain comprising the at least one gNB-DU of the plurality of gNB-DUs in wireless communication with the gNB-CU, the at least one gNB-DU in further communication with a 5G core network via the gNB-CU;
    determining, by the processing system, a demand for the 5G wireless communication services; and
    configuring, by the processing system, the IAB network to obtain a configured IAB network according to the demand and according to the plurality of observations, wherein the configured IAB network comprises the at least one gNB-DU of the plurality of gNB-DUs in wireless communication with the gNB-CU.

2. The method of claim 1, wherein the configuring the IAB network further comprises:
    selecting, by the processing system, the at least one gNB-DU of the plurality of gNB-DUs.

3. The method of claim 2, wherein the configuring the IAB network further comprises:
    selecting, by the processing system, a wireless communication channel to obtain a selected wireless channel, the at least one gNB-DU of the plurality of gNB-DUs in wireless communication with the gNB-CU via the selected wireless channel.

4. The method of claim 3, wherein the selected wireless channel resides within a licensed portion of millimeter wave spectrum.

5. The method of claim 1, wherein the obtaining the plurality of observations of operation of the RAN domain further comprises:
    applying, by the processing system, machine learning to the plurality of observations.

6. The method of claim 1, wherein the network topology comprises one of first distances between pairs of gNB-DUs of the plurality of gNB-DUs, second distances between the plurality of gNB-DUs and the gNB-CU, or first and second distances.

7. The method of claim 6, wherein the network topology further comprises a plurality of gain profiles of the plurality of gNB-DUs.

8. The method of claim 1, further comprising:
    calculating, by the processing system, a reachability of a gNB-DU of the plurality of gNB-DUs and the gNB-CU.

9. The method of claim 1, wherein the determining the demand for the 5G wireless communication services further comprises forecasting the demand.

10. The method of claim 9, further comprising:
    obtaining, by the processing system, historical network traffic patterns of the RAN domain, wherein the forecasting is based on historical network traffic patterns.

11. The method of claim 9, further comprising:
    identifying, by the processing system, a future event; and
    estimating, by the processing system, a network traffic pattern of the RAN domain, wherein the forecasting is based on historical network traffic patterns.

12. A device, comprising:

a processing system including a processor; and a memory that stores executable instructions that, when executed by the processing system, facilitate performance of operations, the operations comprising:

discovering a network topology of a radio access network (RAN) domain of a cellular communication system, the RAN domain comprising a base transceiver station and a wireless backhaul network, wherein the base transceiver station comprises a centralized unit and a plurality of distributed units configured for wireless communication with a user equipment and, via the wireless backhaul network, with the centralized unit;

observing operation of the RAN domain, to obtain a plurality of observations, wherein the wireless backhaul network comprises at least one distributed unit of the plurality of distributed units in wireless communication with the centralized unit, the at least one distributed unit in further communication with a mobile cellular core network via the centralized unit;

determining a demand for a cellular communication service; and configuring the wireless backhaul network to obtain a configured wireless backhaul network according to the demand and according to the plurality of observations, wherein the configured wireless backhaul network comprises the at least one distributed unit of the plurality of distributed units in wireless communication with the centralized unit.

13. The device of claim 12, wherein the configuring the wireless backhaul network further comprises:

selecting the at least one distributed unit of the plurality of distributed units.

14. The device of claim 13, wherein the configuring the wireless backhaul network further comprises:

selecting a wireless communication channel to obtain a selected wireless channel, the at least one distributed unit of the plurality of distributed units in wireless communication with the centralized unit via the selected wireless channel.

15. The device of claim 12, wherein the obtaining the plurality of observations of operation of the RAN domain further comprises:

applying machine learning to the plurality of observations.

16. The device of claim 12, wherein the operations further comprise:

learning network usage patterns to obtain learned usage patterns, wherein the determining the demand for the cellular communication service is based on the learned usage patterns.

17. The device of claim 12, wherein the determining the demand for the cellular communication service further comprises forecasting the demand.

18. A non-transitory machine-readable medium, comprising executable instructions that, when executed by a processing system including a processor, facilitate performance of operations, the operations comprising:

identifying network elements of a radio access domain of a mobile communication system, the radio access domain including a base transceiver station comprising a centralized unit and a plurality of distributed units configured for wireless communication with a user equipment and with the centralized unit;

observing operation of the radio access domain configured to deliver mobile communication services to the user equipment via a least one distributed unit of the plurality of distributed units, wherein the mobile communication services utilize a wireless backhaul network of the radio access domain comprising the at least one distributed unit of the plurality of distributed units in wireless communication with the centralized unit, the at least one distributed unit in communication with a mobile cellular core network via the centralized unit;

determining a demand for the mobile communication services; and configuring the wireless backhaul network to obtain a configured wireless backhaul network according to the demand and according to the observing, wherein the configured wireless backhaul network comprises the at least one distributed unit of the plurality of distributed units in wireless communication with the centralized unit.

19. The non-transitory machine-readable medium of claim 18, wherein the operations further comprise:

storing a record of the observing operation of the radio access domain to obtain a stored record of observations, wherein the configuring the wireless backhaul network is further based on the stored record of observations.

20. The non-transitory machine-readable medium of claim 18, wherein the operations further comprise:

systematically operating, during an evaluation period, the radio access domain according to a schedule of radio access domain resources, wherein the observing operation of the radio access domain comprises the evaluation period.

* * * * *